(12) United States Patent
Zumsteg et al.

(10) Patent No.: US 8,727,225 B2
(45) Date of Patent: May 20, 2014

(54) SYSTEM AND METHOD FOR CALIBRATION AND MAPPING OF REAL-TIME LOCATION DATA

(75) Inventors: Philip Zumsteg, Shorewood, MN (US); Tom Plocher, Hugo, MN (US); Sriharsha Putrevu, Minneapolis, MN (US); Joseph Vargas, Sante Fe, NM (US)

(73) Assignee: Honeywell International Inc., Fort Mill, SC (US)

( * ) Notice: Subject to any disclaimer, the term of this patent is extended or adjusted under 35 U.S.C. 154(b) by 76 days.

(21) Appl. No.: 13/452,133

(22) Filed: Apr. 20, 2012

(65) Prior Publication Data
US 2013/0277430 A1 Oct. 24, 2013

(51) Int. Cl.
*G06K 19/06* (2006.01)
(52) U.S. Cl.
USPC . 235/492; 235/454; 235/462.01; 235/462.09; 235/462.08; 235/462.46; 235/472.02; 235/491
(58) Field of Classification Search
USPC ............ 235/454, 462.01, 462.09, 462.08, 235/462.46, 472.02, 491, 492
See application file for complete search history.

(56) References Cited

U.S. PATENT DOCUMENTS

| | | |
|---|---|---|
| 6,659,344 B2 | 12/2003 | Otto et al. |
| 7,003,138 B2 | 2/2006 | Wilson |
| 7,015,967 B1 | 3/2006 | Kochi et al. |
| 7,237,721 B2 | 7/2007 | Bilcu et al. |
| 7,308,158 B2 | 12/2007 | Herbert et al. |
| 7,405,662 B2 | 7/2008 | Steinke et al. |
| 7,407,096 B2 | 8/2008 | McQueen et al. |
| 7,494,063 B2 | 2/2009 | Kotlarsky et al. |
| 7,501,950 B2 | 3/2009 | Suzuki |
| 7,535,361 B2 | 5/2009 | Doan et al. |
| 7,551,090 B2 | 6/2009 | Doan et al. |
| 7,602,288 B2 | 10/2009 | Broussard |
| 7,627,191 B2 | 12/2009 | Xu et al. |
| 7,677,602 B2 | 3/2010 | Bennett et al. |
| 7,696,874 B2 | 4/2010 | Stevens |
| 7,702,187 B2 | 4/2010 | Rusman et al. |
| 7,708,205 B2 | 5/2010 | Kotlarsky et al. |

(Continued)

OTHER PUBLICATIONS

EPC Global, Specification for RFID Air Interface, EPC Radio-Frequency Identity Protocols Class-1 Generation-2 UHF RFID Protocol for Communications at 860 MHz-960 MHz, Version 1.0.9, Jan. 31, 2005, pp. 1-94.

(Continued)

*Primary Examiner* — Kristy A Haupt
(74) *Attorney, Agent, or Firm* — Oliff PLC; R. Brian Drozd

(57) ABSTRACT

A method of mapping the location of at least one object in three dimensional space, relative to an initial point in three dimensional space by an EIR terminal which contains a microprocessor, memory, a scanning device, a motion sensing device, and a communication interface. The method includes scanning a signal of decodable indicia located at a pre-defined area of a physical object, locating the decodable indicia within this signal, decoding the decodable indicia into a decoded message. The decoded message is an identifier for said physical object, which is then displayed. After receiving an interface command, the EIR terminal is placed in mechanical contact with the pre-defined area of the physical object and a first spatial position is stored as a point of origin in the EIR terminal.

24 Claims, 12 Drawing Sheets

(56) References Cited

U.S. PATENT DOCUMENTS

| | | |
|---|---|---|
| 7,735,731 B2 | 6/2010 | Skaaksrud et al. |
| 7,756,292 B2 | 7/2010 | Lev |
| 7,756,319 B2 | 7/2010 | Odell |
| 7,786,865 B2 | 8/2010 | Park |
| 7,786,925 B1 | 8/2010 | Knibbe et al. |
| 7,815,121 B2 | 10/2010 | Kotlarsky et al. |
| 7,821,400 B2 | 10/2010 | Tabet et al. |
| 7,831,082 B2 | 11/2010 | Holsing et al. |
| 7,855,643 B2 | 12/2010 | Tuttle |
| 7,870,999 B2 | 1/2011 | Skaaksrud et al. |
| 7,883,013 B2 | 2/2011 | Skaaksrud et al. |
| 7,886,972 B2 | 2/2011 | Skaaksrud et al. |
| 7,951,003 B2 | 5/2011 | Russell et al. |
| 7,961,908 B2 | 6/2011 | Tzur et al. |
| 7,965,186 B2 | 6/2011 | Downie et al. |
| 8,115,601 B2 | 2/2012 | Nonaka |
| 8,149,094 B2 | 4/2012 | Deoalikar et al. |
| 2002/0165758 A1 | 11/2002 | Hind et al. |
| 2004/0041029 A1* | 3/2004 | Postman et al. ........... 235/462.3 |
| 2005/0212817 A1 | 9/2005 | Cannon et al. |
| 2006/0262961 A1 | 11/2006 | Holsing et al. |
| 2006/0266836 A1 | 11/2006 | Bilcu et al. |
| 2007/0008136 A1 | 1/2007 | Suzuki |
| 2007/0102506 A1 | 5/2007 | Stevens |
| 2007/0199995 A1 | 8/2007 | Kotlarsky et al. |
| 2007/0215706 A1 | 9/2007 | Kotlarsky et al. |
| 2008/0037899 A1 | 2/2008 | Xu et al. |
| 2008/0061937 A1 | 3/2008 | Park |
| 2008/0111661 A1 | 5/2008 | Lin et al. |
| 2008/0164313 A1 | 7/2008 | Kotlarsky et al. |
| 2008/0164317 A1 | 7/2008 | Kotlarsky et al. |
| 2008/0169343 A1 | 7/2008 | Skaaksrud et al. |
| 2008/0172303 A1 | 7/2008 | Skaaksrud et al. |
| 2008/0173706 A1 | 7/2008 | Skaaksrud et al. |
| 2008/0173710 A1 | 7/2008 | Skaaksrud et al. |
| 2008/0203147 A1 | 8/2008 | Skaaksrud et al. |
| 2008/0203166 A1 | 8/2008 | Skaaksrud et al. |
| 2008/0210749 A1 | 9/2008 | Skaaksrud et al. |
| 2008/0210750 A1 | 9/2008 | Skaaksrud et al. |
| 2008/0224870 A1 | 9/2008 | Yeo et al. |
| 2008/0285091 A1 | 11/2008 | Skaaksrud et al. |
| 2009/0021353 A1 | 1/2009 | Nanaka |
| 2009/0040025 A1 | 2/2009 | Volpi et al. |
| 2009/0045913 A1 | 2/2009 | Nelson et al. |
| 2009/0045924 A1 | 2/2009 | Roberts, Sr. et al. |
| 2009/0121025 A1 | 5/2009 | Romanchik |
| 2009/0161964 A1 | 6/2009 | Tzur et al. |
| 2009/0243801 A1 | 10/2009 | Strzelczyk |
| 2009/0245755 A1 | 10/2009 | Lee et al. |
| 2009/0322537 A1 | 12/2009 | Tapp et al. |
| 2010/0045436 A1 | 2/2010 | Rinkes |
| 2010/0073487 A1 | 3/2010 | Sogoh et al. |
| 2010/0109844 A1 | 5/2010 | Carrick et al. |
| 2010/0109903 A1 | 5/2010 | Carrick |
| 2010/0142825 A1 | 6/2010 | Maxwell et al. |
| 2010/0148985 A1 | 6/2010 | Lin et al. |
| 2010/0201488 A1 | 8/2010 | Stern et al. |
| 2010/0201520 A1 | 8/2010 | Stern et al. |
| 2010/0220894 A1 | 9/2010 | Ackley et al. |
| 2010/0226530 A1 | 9/2010 | Lev |
| 2010/0232712 A1 | 9/2010 | Tomita et al. |
| 2010/0252621 A1 | 10/2010 | Ito et al. |
| 2010/0271187 A1* | 10/2010 | Uysal et al. ................. 340/10.4 |
| 2010/0296753 A1 | 11/2010 | Ito et al. |
| 2010/0303348 A1 | 12/2010 | Tolliver et al. |
| 2010/0308964 A1 | 12/2010 | Ackley et al. |
| 2011/0052008 A1 | 3/2011 | Holsing et al. |
| 2011/0084808 A1 | 4/2011 | Tuttle |
| 2011/0115947 A1 | 5/2011 | Oh |
| 2011/0128125 A1 | 6/2011 | Kai et al. |
| 2011/0143811 A1 | 6/2011 | Rodriguez |
| 2011/0205387 A1 | 8/2011 | Tzur et al. |
| 2011/0212717 A1 | 9/2011 | Rhoads et al. |
| 2011/0280447 A1 | 11/2011 | Conwell |
| 2011/0284625 A1 | 11/2011 | Smith et al. |
| 2011/0290883 A1 | 12/2011 | Kotlarsky et al. |

OTHER PUBLICATIONS

U.S. Appl. No. 13/359,005 entitled "Portable RFID Reading Terminal With Visual Indication of Scan Trace" filed Jan. 26, 2012, pp. 1-27.

U.S. Appl. No. 13/451,761 entitled "Portable Encoded Information Reading Terminal Configured to Locate Groups of RFID Tags" filed Apr. 20, 2012, pp. 1-21.

U.S. Appl. No. 13/451,744 entitled "Portable Encoded Information Reading Terminal Configured to Acquire Images" filed Apr. 20, 2012, pp. 1-27.

U.S. Appl. No. 13/451,959 entitled "Portable Encoded Information Reading Terminal Configured to Adjust Transmit Power Level" filed Apr. 20, 2012, pp. 1-38.

U.S. Appl. No. 13/474,014 entitled "Cloud-Based System for Reading of Decodable Indicia" filed May 17, 2012, pp. 1-28.

U.S. Appl. No. 13/545,454 entitled "Cloud-Based System for Processing of Decodable Indicia" filed Jul. 10, 2012, pp. 1-24.

* cited by examiner

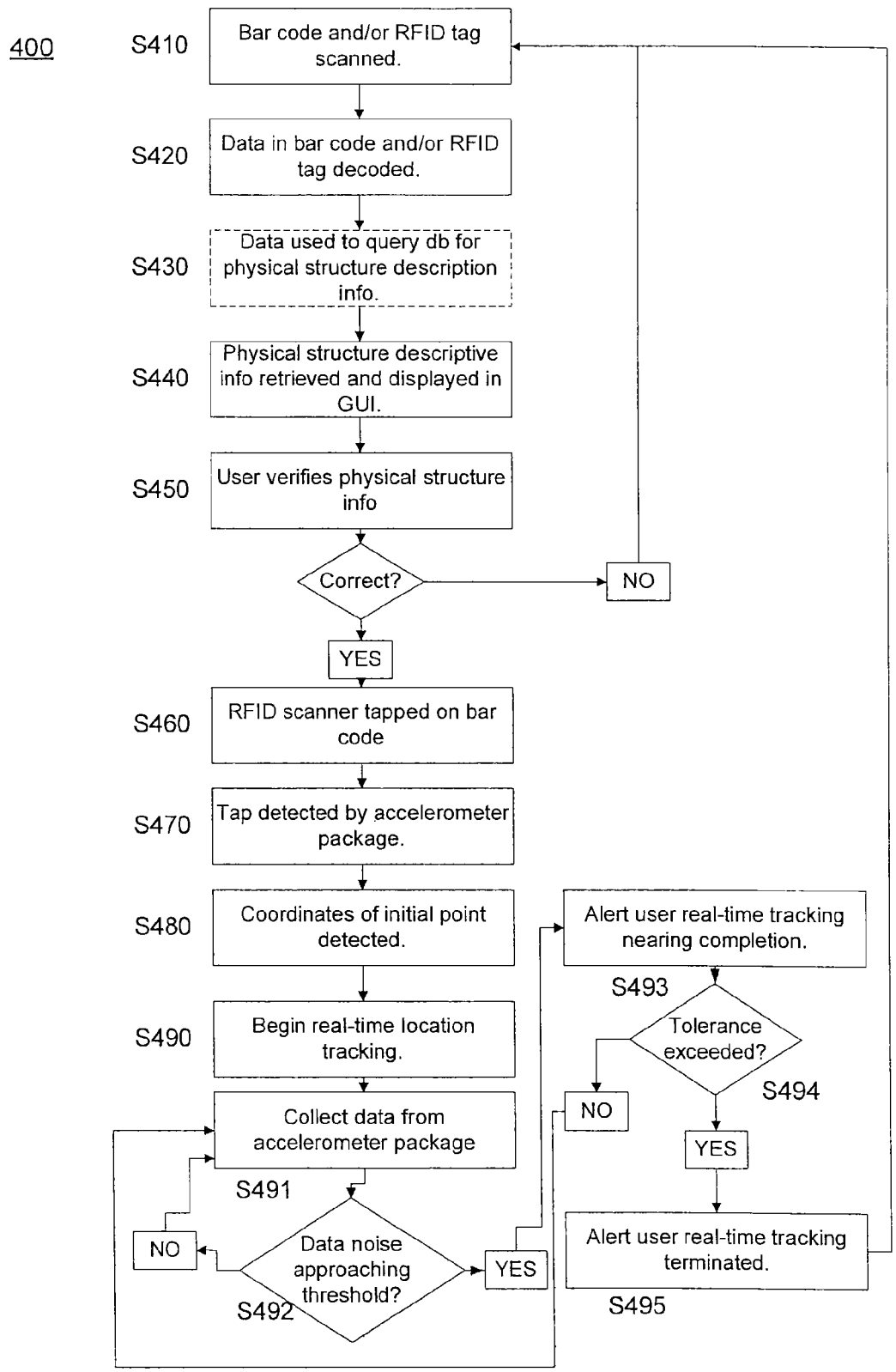

Dept-100-Fixture-A01

Fixture-A01-H60xW120xS4-Tap-LeftxH30xW0

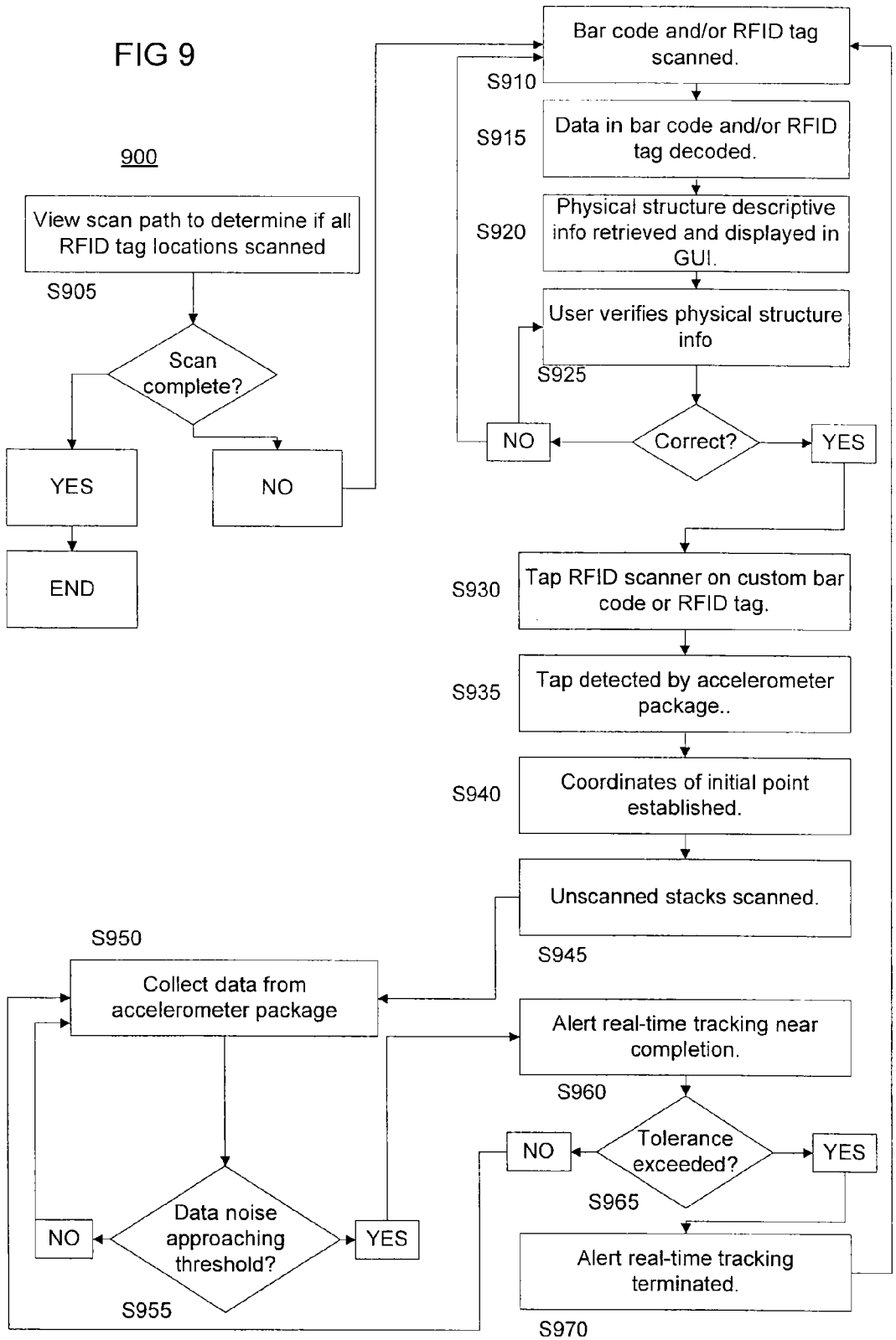

SYSTEM AND METHOD FOR CALIBRATION AND MAPPING OF REAL-TIME LOCATION DATA

FIELD OF INVENTION

The present invention relates to a system and method of collecting data with an encoded information reading (EIR) terminal where the resultant data can be utilized to map the location of at least one object in three dimensional space, relative to an initial point in three dimensional space.

BACKGROUND OF INVENTION

Radio-frequency identifier (RFID) methods are widely used in a number of applications, including smart cards, item tracking in manufacturing, inventory management in retail, etc. An RFID tag can be attached, e.g., to an inventory item. An EIR terminal can be configured to read the memory of an RFID tag attached to an inventory item.

EIR terminals with integrated RFID reading capabilities can read RFID tags from a range of distances and various terminal orientations with respect to an RFID tag being read. When an EIR terminal comprising an RFID reading device is configured to display a scan trace, it provides the EIR terminal's operator with a visual feedback with respect to the scanning progress. At any moment in time, the RF signal coverage emitted by an EIR terminal can be defined by a 3D shape. The form and size of the 3D shape defining the RF signal coverage depends, among other factors, on the orientation of the EIR terminal, the RFID transmit power level, and the number and configuration of the RF antennas employed by the EIR terminal. Hence, a target scan area by an EIR terminal can be visualized as a projection of the 3D RF signal coverage shape onto an arbitrarily chosen plane.

For a moving EIR terminal, a visual scan trace can be provided by different graphical representations such as a solid line, continuous line, or a dotted line, each line defined by a multitude of time varying points, each point being a projection of the 3D RF signal coverage shape onto the arbitrarily chosen plane at a given moment in time. The imaginary plane onto which the visual scan trace is projected can be chosen to intersect a physical structure containing a plurality of items to be inventoried, and thus the scan trace can be overlaid over an image of the physical structure.

RFID reading devices usually offer improved efficiency over bar code scanning devices for retail inventory, by being capable of reading multiple RFID tags that are within range of the RF signal transmitted by an RFID reading device. A downside to this multiple-read capability is lack of scanned items localization, due to insufficient correlation between where the RFID reader is located or oriented, and the RFID tags being read. Retail inventory management typically requires more than 90% of the RFID tags present in a department to be successfully acquired during the inventory process. When this high accuracy is not achieved, it is currently necessary to rescan the entire department, since the locations of any unread RFID tags are unknown.

A need exists for a method and system for inventory management that capitalizes on the advantages of RFID tags, while improving efficiency.

SUMMARY OF INVENTION

An object of the present invention is to increase profits by efficiently and effectively tracking inventory so that sales are not lost because items are unexpectedly out of stock due to inventory errors. When merchants do not purchase popular products under the mistaken impression that these products are still in stock, potential sales are lost.

Another object of the present invention is to simplify the effort required to track inventory.

Another object of the present invention is to automate the steps required to track inventory so that the process is less susceptible to human error, is faster, and therefore requires less human labor, lowering labor costs.

Another object of the present invention is to provide an inventory-tracking system and method that is transferrable and useable across products and hardware and software platforms.

Another object of the present invention is to provide an inventory-tracking system and method that is useable across many inventory display configurations, physical structures, including but not limited to rectangular shelving units, circular hanging racks, linear racks, and tables.

An embodiment of the present invention includes the following components: 1) an EIR terminal configured to read RFID tags; and 2) data regarding the overall dimensions of a physical structure for which a scan trace is to be displayed. In embodiments of the present invention, the dimension data for a given physical structure can be stored in at least one database, or it can be available as part of a custom bar code and/or RFID tag affixed to the physical structure. In an embodiment of the present invention, when the dimension data is stored in one or more databases, it is indexed by a value in a custom bar code and/or RFID tag affixed to the physical structure and accessed by the EIR terminal upon scanning this value.

An embodiment of the present invention utilizes an EIR terminal with a graphical user interface (GUI). This EIR terminal is configured to scan/read RFID tags and images of decodable indicia, such as barcodes. The EIR terminal is augmented with an imaging device, positioning package, including but not limited to, a 3-axis (3 dimensional) accelerometer package, and a 9-DOF (degree of freedom) IMU (Inertial Measurement Unit) containing a 3-axis accelerometer, a 3-axis magnetometer, and 3-axis gyroscope sensors, to acquire movement and position calibration data regarding the motion of the EIR terminal. The mechanism to scan bar codes includes but is not limited to optical scanners and/or image capture devices, such as cameras.

The inclusion of a 3D accelerometer suite in a hand-held RFID scanner, such as an EIR terminal, in an embodiment of the present invention, enables the device to perform a variety of functions to assist in inventory control, including but not limited to establishing a calibrated reference point, acquire scan trace motion data, and map the motion of the EIR terminal to the physical structure image in order to display the scan trace.

In addition to the 3D accelerometer suite, in an embodiment of the present invention, a 3-axis magnetometer is integrated into an EIR terminal. The magnetometer, which acts in part as a compass, is integrated into the software of the EIR terminal and executed on a processor in the EIR terminal. In another embodiment of the present invention, the magnetometer is integrated as a hardware component. The magnetometer tracks the movement of the EIR terminal, in three dimensions, through space by collecting data regarding the changes in the magnetic field around the EIR terminal. Thus, together with the accelerometer package, the magnetometer is also involved in determining both the motion and the orientation of the EIR terminal.

A 3-axis gyroscope sensor is integrated into an embodiment of the present invention. The gyroscope aids the 3D accelerometer in determining motion and orientation because the gyroscope allows the calculation of orientation and rotation. This addition of the gyroscope sensor provides a more accurate recognition of movement within a 3D space than the lone accelerometer package.

An embodiment of the present invention employs an integrated 3-axis accelerometer suite, 3-axis magnetometer, and a 3-axis gyroscope sensor. Together, these components provide data regarding the location of the EIR terminal while moving through space.

In another embodiment of the present invention, an integrated 3-axis accelerometer suite, 3-axis magnetometer, and a 3-axis gyroscope sensor are employed to provide data regarding both the location and the orientation of the EIR terminal as it moves through space.

An embodiment of the present invention utilizes a custom bar coding scheme for physical structures. Each custom bar code is encoded with data that describes the physical structure (e.g., display and/or storage mechanism) used to display and/or store inventory, including but not limited to a reference identifier, the dimensions of the physical space, number of shelves, display surfaces, and/or hanging racks on each physical structure.

An embodiment of the present invention utilizes an RFID-tagging scheme for physical structures. In this embodiment, each custom RFID tag contains data that describes the physical structure (e.g., display and/or storage mechanism) used to display and/or store inventory, including but not limited to a reference identifier, the dimensions of the physical space, number of shelves, display surfaces, and/or hanging racks on each physical structure.

As aforementioned, data describing the physical structure encoded in either a custom bar code and/or on an RFID tag may provide the full dimensional data for a physical structure, or may provide a reference that can be used by the EIR terminal via a communication connection to obtain the full information from a data source. In an embodiment of the present invention that utilizes a database or group of databases, including but not limited to one or more remote databases or one or more local databases, to retrieve the dimensions of a given physical structure, the records stored in the one or more databases are indexed by the decoded values of images of decodable indicia scanned by a bar code reader and/or signals from an RFID receiver/reader in the EIR terminal.

In an embodiment of the present invention, the bar code scanning capability of the EIR terminal and/or the RFID reading capability of the EIR terminal is utilized to scan a custom bar code or RFID tag affixed to the physical structure. The EIR terminal, upon decoding the data in the bar code and/or reading the data on the RFID tag, queries a database to obtain additional information about the physical structure that the encoded data represents.

In an embodiment of the present invention, a "scan and tap" method is utilized to map the location of at least one object in three dimensional space, relative to an initial point in three dimensional space. When an EIR terminal scans a signal of decodable indicia, such as a bar code or RFID tag, this EIR terminal reads the coordinates of the signal source in the local reference frame. By tapping the EIR terminal, the resultant spike in the accelerometer data is used to set the initial point coordinates (x0, y0. z0) and store these coordinates in a memory, including but not limited to, a memory resource in the EIR terminal itself, or an external resource accessible to the EIR terminal via a communications connection. In the reference frame of the EIR terminal, the coordinates are set to (0,0,0). Thus, as the EIR terminal moves through three-dimensional space, motion with respect to the EIR terminal's own (0,0,0) can be mapped to the local reference frame using the initial point coordinates (x0, y0, z0). In an embodiment of the present invention, the local reference frame is aligned with respect to the physical structure.

In another embodiment of the present invention, the EIR terminal integrated with an IMU (containing a 3-axis accelerometer, a 3-axis magnetometer, and 3-axis gyroscope sensors) is utilized to record both the location of the EIR terminal in three dimensional space and record the initial point coordinates, the IMU also assists the EIR terminal in determining the orientation of the EIR terminal, both during the "tap" and as it moves through space. The orientation of the EIR terminal describes the position of the EIR terminal itself. For example, an EIR terminal can be at a given location, for example (x0,y0,z0) but the orientation of the EIR terminal at this location may vary. The EIR terminal may be held perfectly upright at this location and that is one orientation, but the EIR terminal may also be held at an angle relative to any direction in three dimensional space. This angle would represent a different orientation. In this embodiment, the "tap" and when the EIR terminal in moved relative to the initial point, both the location of the EIR terminal and the orientation of the terminal are stored in a resource, including but not limited to an internal resource in the EIR terminal and/or an external memory resource accessible to the EIR terminal via a communications connection.

Although the present invention has been described in relation to utilizing a customized barcode and/or RFID tag scheme, and an EIR terminal to calibrate an inventory management system, many other variations and modifications will become apparent to those skilled in the art.

BRIEF DESCRIPTION OF DRAWINGS

FIG. 4 depicts a workflow of an embodiment of the present invention.

FIG. 9 depicts a workflow of an embodiment of the present invention.

DETAILED DESCRIPTION OF THE INVENTION

Figure 1:
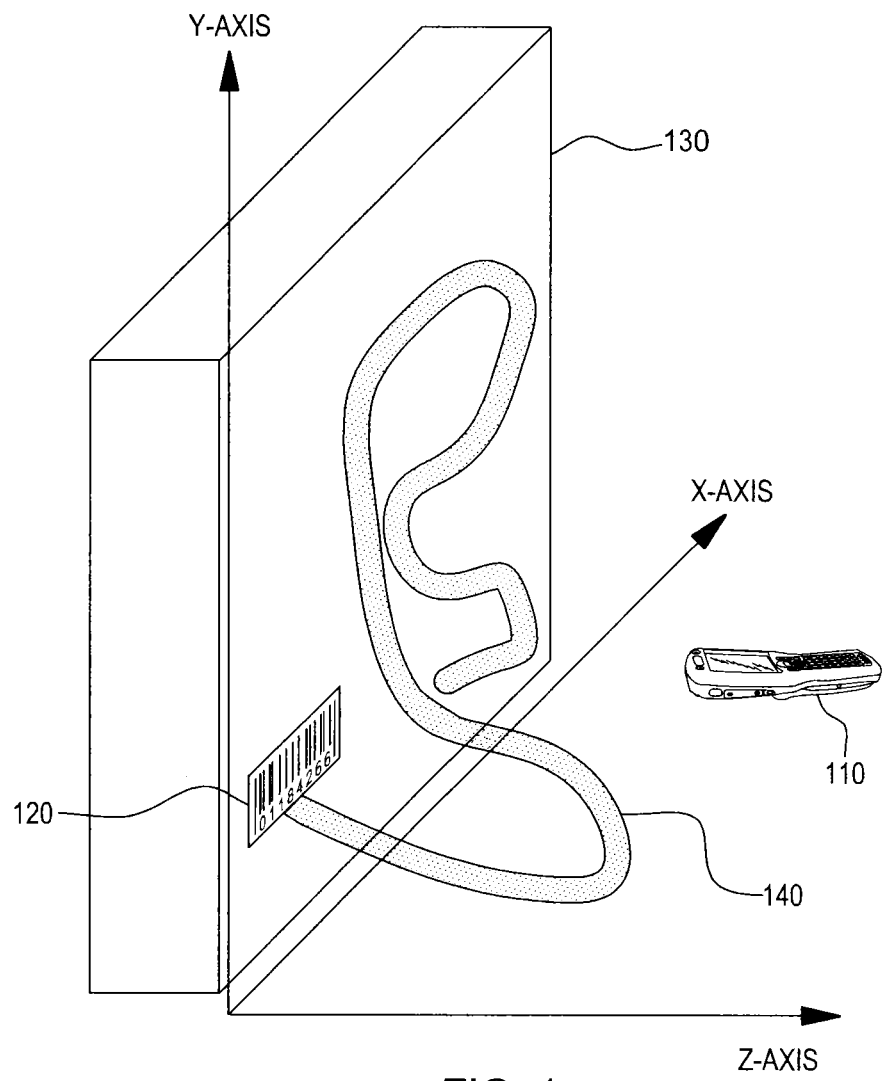
FIG. 1 depicts an embodiment of and aspect of the present invention.

The present system and method provides foundational data to a display a a scan trace on an EIR terminal with an RFID reading device by augmenting a scanner that captures and decodes signals of decodable indicia, including bar codes and RFID tags, with a motion sensing "package", including but not limited to a 3-axis (3 dimensional) accelerometer (i.e., at least three accelerometers configured to measure the proper acceleration values of the EIR terminal along three mutually perpendicular axes), and/or a 9-DOF IMU (Inertial Measurement Unit) (containing a 3-axis accelerometer, a 3-axis magnetometer, and 3-axis gyroscope sensors).

U.S. patent application Ser. No. 13/359,005, filed Jan. 26, 2012 and commonly assigned, which is incorporated herein by reference in its entirety, describes and claims an EIR terminal configured to read RFID tags and display a scan trace, thus providing the terminal's operator with a visual feedback with respect to the scanning progress. The terminal relies upon certain information when creating the visual feedback, this information includes, but is not limited to, the physical characteristics of a physical structure used to store or display inventory, the movement and orientation of the EIR terminal relative to the physical structure, establishing an initial point of movement, and mapping the movement and orientation of the EIR terminal relative to the physical structure to the GUI display.

In an embodiment of the present invention, the motion of the EIR terminal is sensed by a 3-axis accelerometer package. Bringing the EIR terminal into a mechanical contact with a stationary object results in a distinctive spike in the data returned by the 3-axis accelerometer package, due to the sudden change in acceleration and velocity to zero. At the point of contact, the initial distance between the EIR terminal and the stationary object is defined to be zero. The initial distances of the EIR terminal along the X-axis, Y-axis and Z-axis in the local reference frame are set to the values determined by the custom barcode and/or RFID tag that was scanned immediately prior to the occurrence of mechanical contact between the EIR terminal and the physical structure.

The 3-axis accelerometer package acquires movement and initial position calibration data for the EIR terminal. In an embodiment of the present invention, initial calibration data may be obtained directly from the custom barcode and/or RFID tag, or indirectly from a local or remote database using information on the custom barcode and/or RFID tag to access the appropriate entry in the database.

Data from the 3-axis accelerometer sensors can be used to determine the velocity and distance of motion at each point in time. Moving the accelerometer package enables only the "relative" motion of the package to be determined, with respect to the initial set of coordinates. The system and method of the present invention enables data from the accelerometer to be combined with the initial coordinates and dimensions of a selected physical structure, then mapped onto a GUI to display a scan path overlay on a depiction of a selected physical structure.

In an embodiment of the present invention, where the EIR terminal is additionally augmented with a 3-axis magnetometer sensors and/or a 3-axis gyroscope sensors, the data gathered by these components (integrated as hardware and/or software) augments the accelerometer data for sensing movement. Although the accelerometer alone is used during the "tap" procedure, which is discussed later, during the subsequent movements of the EIR terminal, data accumulated by the 3-axis magnetometer and/or the 3-axis gyroscope, with the 3-axis accelerometer, measure the motion and the orientation of the EIR terminal through space. For example, in an embodiment of the present invention that includes one or both of a 3-axis magnetometer and/or a 3-axis gyroscope, the data accumulated by these components is used as part of the computations to remove gravity effects from the 3-axis accelerometer data. In an embodiment of the present invention, the 3-axis magnetometer sensors and/or a 3-axis gyroscope sensors record data representing the orientation of the EIR terminal in space.

In an embodiment of the present invention, a user scans a custom bar code and/or an RFID tag on a physical structure and then "taps" the EIR terminal on that bar code or tag, to create an initial set of coordinates in the frame of reference of the physical structure for mapping subsequent movement of the EIR terminal. Thus, the X-, Y- and Z-axes are defined with respect to a physical structure. For example, when mapping a rectangular physical structure, the X-axis can represent the left-right dimensions of the physical structure, the Y-axis can represent the up-down dimensions, and Z-axis can represent the in-out dimensions (i.e., the perpendicular distance between the EIR terminal and the physical structure). This frame of reference includes the EIR terminal, following the calibration step of "tapping" the EIR terminal on the custom bar code and/or RFID tag affixed to the physical structure. If the EIR terminal is not calibrated by "tapping," the EIR terminal will only provide a relative movement data to the GUI on the EIR terminal. By "tapping" the EIR terminal at the location of the custom bar code and/or RFID tag, the EIR terminal is mapped to a known location in the "local frame of reference" used by the physical structure. As a result, subsequent motion reporting from the accelerometer package may be interpreted as motion in the "local frame of reference" and can therefore be overlaid on the physical structure image by the GUI display.

In addition to defining the location of the initial point and subsequent points, in an embodiment of the present invention, the orientation of the EIR terminal in three dimensional space is also defined. As the EIR terminal moves through space, the orientation is recorded by the EIR terminal; it is calculated using data from an IMU. As described earlier, while the location of the EIR terminal can be represented relative to an X, Y, and Z axis, as depicted in FIG. 1, an EIR terminal 110 at a specific location, at given coordinates, can have a variety of different orientations. For example, the EIR terminal 110 can be held perpendicular to the Y-axis in FIG. 1, at a 75 degree angle relative to the Y-axis, or at various orientations relative to the remainder of the axes in FIG. 1. The orientation of the EIR terminal in three dimensional space coupled with the location provides the EIR terminal with more information to describe and map its movement.

As explained later in greater detail, the "scan and tap" method is utilized to map the location of at least one object in three dimensional space, relative to an initial point in three dimensional space. The scan and tap procedures establish an initial point of the EIR terminal in the local reference frame. In the "scan" portion, an EIR terminal scans a signal of decodable indicia, such as a bar code or RFID tag, and this EIR terminal reads the coordinates of the signal in the local reference frame. During the "tap," i.e., tapping the EIR terminal at the location of the signal of decodable indicia, the resultant spike in the accelerometer data is used to set the EIR terminal initial point coordinates (x0, y0. z0). In the EIR terminal reference frame, the coordinates are set to (0,0,0). Thus, as the EIR terminal moves through three-dimensional space, motion with respect to the EIR terminal's own (0,0,0), motion of the EIR terminal can be mapped to the local reference frame using the initial point coordinates (x0, y0, z0).

FIG. 1 depicts an aspect of an embodiment of the present invention. The aspect depicted in FIG. 1 will be discussed in greater detail in further illustrations. In FIG. 1, the EIR terminal 110 is used to read the bar code 120 and then the EIR terminal 110 is tapped (physical contact is made) to the location of the bar code 120 on the physical structure 130. Further embodiments of the present invention employ an RFID tag instead of or in addition to a bar code. The location of the bar code 120 becomes the initial point, and is represented by the physical coordinates at which the bar code 120 is affixed to the physical structure 130. In the EIR terminal reference frame, the Z-axis coordinate is 0 at the initial point because the initial distance between the EIR terminal and the stationary object is defined to be zero; the initial point is established when the EIR terminal is in contact with the custom bar code and/or RFID tag. The initial distances along the X-axis and Y-axis are set to the values determined by the custom barcode and/or RFID tag that was scanned immediately prior to the occurrence of mechanical contact between the EIR terminal and the physical structure. Once the initial point coordinates are established, the EIR terminal can trace the movement relative to the physical structure in a local frame of reference. The wavy line 140 represents the traced movement of the EIR terminal.

Figure 2:
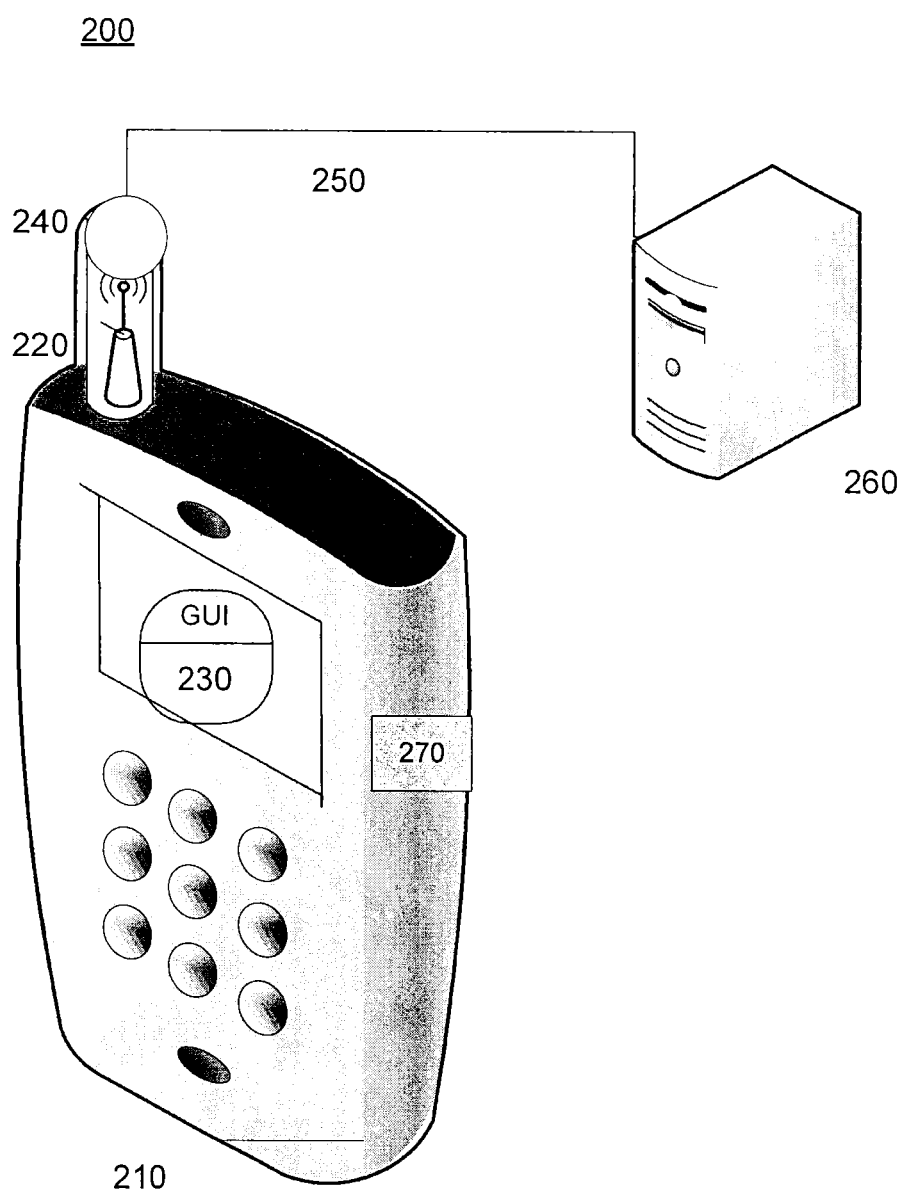
FIG. 2 depicts a technical architecture of an embodiment of the present invention.

Referring to FIG. 2, a technical architecture 200 of an embodiment of the present invention includes a hand-held EIR terminal 210 and a database 260, accessible to the EIR terminal 210 via a wireless network connection 250. The hand-held EIR terminal 210 includes an RFID scanner 220, a graphical user interface (GUI) 230, a mechanism for scanning images of decodable indicia 240, such as bar codes, and is augmented with at least a 3-axis (3 dimensional) accelerometer package 270.

Another embodiment of the present invention employs neither a wireless network connection 250 or a database 260. In the embodiment of FIG. 2, the wireless network connection 250 and the database 260 provide information about a physical structure to the EIR terminal 210. However, in other embodiments of the present invention, this data can also be stored in a custom bar code or RFID tag that is scanned by the EIR terminal, Bar codes are graphical representations of data, images of decodable indicia, the most common of which are referred to as one dimensional (1D) and two dimensional (2D) bar codes. 1D bar codes are images that represents data by varying the widths and spacings of parallel lines. 2D bar codes are also images that represent data, but in addition to the parallel lines, or bars, a 2D bar code may contain rectangles, dots, hexagons and other geometric patterns in two dimensions. A common example of a 2D bar code is a Quick Response (QR) code. QR codes consist of black modules arranged in a square pattern on a white background. The data encoded in bar codes are interpreted by optical scanners and/or software.

The mechanism for scanning images of decodable indicia 240 in FIG. 2 is an optical scanner. However, further embodiments of the present invention include a camera and supporting decoding software, run either on a processor on or coupled to the EIR terminal 210, or at a remote processing resource, in a client-server or application service provider configuration.

Referring the FIG. 2, the system and method of the present invention is explained in reference to this technical architecture. In the explanation of the system and method, each time a bar code and/or the scanning of a bar code on a physical structure is referenced, one of skill in the art will recognize that this description also relates to the use of an RFID tag in addition to and/or in place of the bar code, and the scanning of the RFID tag in addition to and/or in place of the scanning of the bar code. The bar code is discussed in reference to FIG. 2 to aid in comprehension and in no way should be interpreted to limit the scope of the system and method disclosed.

Referring to FIG. 2, database 260 is depicted as a database residing on a single computer at a location remote from the EIR terminal 210. However, in further embodiments of the present invention, the functionality of database 260 is embodied by a local data storage resource within the EIR terminal 210. Those of skill in the art will recognize that the functionality of database 260 can be split over a number of physical locations and/or computers.

A "computer" herein shall refer to a programmable device for data processing and control, including a central processing unit (CPU), a memory, and at least one communication interface. For example, in one embodiment, a computer can be provided by a server running a single instance of a multi-tasking operating system. In an embodiment of FIG. 2, the accelerometer package 270 of FIG. 2 is an embedded computer in which there is a single instance of a single-threaded operating system.

In another embodiment, a computer can be provided by a virtual server, i.e., an isolated instance of a guest operating system running within a host operating system and accessed via a network connection. A "network" herein shall refer to a set of hardware and software components implementing a plurality of communication channels between two or more computers. Such communication channels may be implemented by either wired or wireless physical links. A network can be provided, e.g., by a local area network (LAN), or a wide area network (WAN). While different networks can be designated herein, it is recognized that a single network as seen from the application layer interface to the network layer of the OSI model can comprise a plurality of lower layer networks, i.e., what can be regarded as a single Internet Protocol network, can include a plurality of different physical networks.

Using the EIR terminal 210, in communication with the database 260, the mechanism for scanning images of decodable indicia 240 is used to scan a bar code affixed to the physical structure at a known set of coordinates, an initial point. The data encoded in the bar code is decoded and used by the EIR terminal 210 to query the database 260, to retrieve descriptive information about the physical structure, including at least the physical dimensions of the physical structure.

This initial point provided by the bar code and/or RFID tag is represented by the physical coordinates at which the bar code is affixed to the physical structure. The initial point maps the reference frame of the accelerometer package to the "local reference frame" of the physical structure. For example, if the bar code and/or RFID tag is affixed to a given physical structure on the left side, 30 inches above the floor, then the initial point coordinates=(0, 30, 0) with units of "inches". At this initial point, X=0 (i.e. far left edge of physical structure), Y=30 (inches above the floor), and Z=0 (touching the front plane of the physical structure). The Z-axis coordinate is 0 at the initial point because the initial distance between the EIR terminal and the stationary object is defined to be zero; the initial point is established when the EIR terminal is in contact with the custom bar code and/or RFID tag. The initial distances along the X-axis and Y-axis are set to the values determined by the custom barcode and/or RFID tag that was scanned immediately prior to the occurrence of mechanical contact between the EIR terminal and the physical structure.

In addition to determining the location of the EIR terminal 210, the accelerometer package 270 can also assist in a determination of the orientation of the EIR terminal 210 at the initial point (and during later movements) in three dimensional space.

After the initial point is acquired, if the RFID scanner 220 in the EIR terminal 210 is used to scan for RFID tags affixed to items of inventory on the physical structure, the EIR terminal can trace the movement relative to the physical structure in a "local" frame of reference. This process is described in greater detail in FIG. 4.

In a another embodiment of the present invention, the data encoded in the bar code is decoded and used by the EIR terminal 210 to query a local resource, such as a database within the EIR terminal 210 (not shown), to retrieve descriptive information about the physical structure, including at least the coordinates of the bar code and/or RFID tag mounting location on the physical structure, and the physical dimensions of the physical structure. After this information has been acquired by the EIR terminal 210, the location of the bar code becomes the initial point. Then, if the RFID scanner 220 in the EIR terminal 210 is moved in three dimensional space the EIR terminal can trace the movement relative to the physical structure in a "local" frame of reference.

In a another embodiment of the present invention, the data encoded in the bar code is decoded by the EIR terminal 210 and the decoded data contains descriptive information about the physical structure, including at least the coordinates of the bar code and/or RFID tag mounting location on the physical structure, and the physical dimensions of the physical structure. After this information has been acquired by the EIR terminal 210, the location of the bar code is used as the initial point. Then, if the RFID scanner 220 in the EIR terminal 210 is moved in three dimensional space, the EIR terminal can trace the movement relative to the physical structure in a "local" frame of reference.

As discussed earlier, some embodiments of the present invention utilize RFID tags to supply data relating to the dimensions of physical structures and coordinates of the RFID tag on the physical structure in the same manner as the use of bar codes is discussed in reference to FIG. 2.

Figure 3:
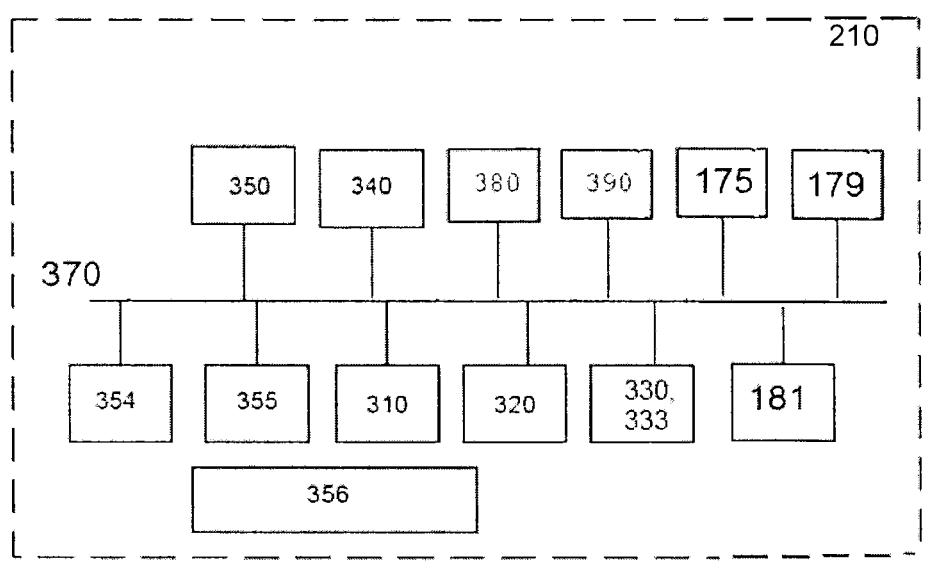
FIG. 3 depicts an embodiment of an aspect of the present invention.

A component-level diagram of an embodiment of the EIR terminal 210 is described with references to FIG. 3. The EIR terminal 210 can comprise at least one microprocessor 310 and a memory 320, both coupled to the system bus 370. The microprocessor 310 can be provided by a general purpose microprocessor or by a specialized microprocessor (e.g., an ASIC). In one embodiment, EIR terminal 210 can comprise a single microprocessor which can be referred to as a central processing unit (CPU). In another embodiment, EIR terminal 210 can comprise two or more microprocessors, for example, a CPU providing some or most of the EIR terminal functionality and a specialized microprocessor performing some specific functionality. A skilled artisan would appreciate the fact that other schemes of processing tasks distribution among two or more microprocessors are within the scope of this disclosure.

EIR terminal 210 can further comprise a communication interface 340 communicatively coupled to the system bus 370. In one embodiment, the communication interface can be provided by a wired or wireless communication interface. The wired or wireless communication interface can be configured to support, for example, but not limited to, the following protocols: at least one protocol of the IEEE 802.3, 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

EIR terminal 210 can further comprise a battery 356. In one embodiment, the battery 356 can be provided by a replaceable rechargeable battery pack. The EIR terminal 210 can further comprise a GPS receiver 380. The EIR terminal 210 can further comprise at least one connector 390 configured to receive a subscriber identity module (SIM) card.

The EIR terminal 210 can further comprise an imaging device 330, provided, for example, by a two-dimensional imager.

The EIR terminal 210 can further comprise one or more devices 330, 333 configured to decode a signal of decodable indicia, such as a bar code and/or an RFID tag. In one embodiment, a bar code scanner 333, such as an optical scanning device, can be configured to scan a bar code containing an encoded message and to output raw message data containing the encoded message. In another embodiment, the RFID reading device 330 can be configured to read a memory of an RFID tag containing an encoded message and to output decoded message data corresponding to the encoded message. As used herein, "message" is intended to denote a bit sequence or a character string comprising alphanumeric and/or non-alphanumeric characters. An encoded message can be used to convey information, such as identification of the source and the model of an item, for example, in an EPC code.

Although devices 330, 333 are depicted in FIG. 3 in a single entity, one of skill in the art will recognize that in further embodiments of an EIR terminal 210 of the present invention could include devices that are not grouped together to handle imaging and reading RFID tags. The EIR terminal 210 of FIG. 3 is offered merely as an sample architecture.

In one embodiment, the EIR terminal 210 can further comprise a graphical user interface including a display adapter 175 and a keyboard 179. In one embodiment, the EIR terminal 210 can further comprise an audio output device, e.g., a speaker 181.

The keyboard 179 can be a full QWERTY keyboard and/or limited inputs that start and stop various activities, including, but not limited to scanning a bar code, scanning an RFID tag, initiating and stopping the collection of data from an accelerometer package. The keyboard 179 may be implemented as a touchscreen, discrete keys, or other methods, which in no way limit the scope of the invention.

EIR terminals include, but are not limited to cellular telephones, smart phones, PDAs, and/or other portable computing device that is capable of reading RFID tags and/or scanning bar codes.

FIG. 4 depicts of a workflow 400 of an embodiment of the present invention accomplished utilizing the technical architecture of FIG. 2. This workflow 400 depicts the system and method of acquiring data to map the location of at least one object in three dimensional space, relative to an initial point in three dimensional space. In this workflow 400, the EIR terminal 210 acquires the information necessary to provide visual feedback to the user via the GUI 230 that provides the user with relative positioning data of the EIR terminal 210 in a local framework relative to a physical structure.

First, the mechanism for scanning images of decodable indicia 240 in the EIR terminal 210 is used to scan a custom bar code (S410). Encoded in this custom bar code is data describing a physical structure upon which inventory to be tracked may be exhibited. Provided that the bar code is unique, and/or unique for each physical structure type, additional information about the physical structure can be retrieved from the database 260 using an identifier encoded in the bar code, as the bar code is a primary key or the database is indexed by information decoded from the bar code.

Figure 5A:
FIGS. 5a-5b depicts embodiments of an aspect of the present invention.
Figure 5B:

FIGS. 5a and 5b are examples of custom bar codes utilized by different embodiments of the present invention. FIG. 5a is an example of a custom bar code utilized by the embodiment of FIG. 2. In FIG. 5a, the bar code contains at least a partial description of a physical structure. This partial description is sufficient for database lookup of the coordinates of the bar code and/or RFID tag mounting location on the physical structure, the physical dimensions of the physical structure, shelf counts, etc. The retrieved coordinates are used by the EIR terminal as an initial point. Although a partial bar code is physically smaller, to utilize the full descriptive information, the EIR terminal 210, may employ a communications connection, such as a wireless network connection 250, to execute a lookup in a remote database 260, or the EIR terminal 210 may query a local database.

In FIG. 5b, the bar code contains at least a partial description of a physical structure, including but not limited to, an identifier and physical dimensions of the physical structure and the location on the physical structure where the bar code is affixed. The location of this bar code is used by the EIR terminal as the initial point. The data encoded in FIG. 5b is not supplemented via a database lookup.

FIGS. 6a-6f depict various physical structures whose descriptions can be encoded into custom bar codes that are scanned and decoded by the EIR terminal 210. In another embodiment of the present invention, keys are encoded in the bar codes and physical structure information coordinating with each bar code is retrieved from the database 260 upon decoding each bar code.

FIGS. 6a-6f are examples of physical structures that are commonly found in retail environments and are not meant to limit the data content of the custom bar codes utilized in this embodiment of the system and method as a whole. One of skill in the art will recognize that descriptive data for a variety of physical structures can be encoded into custom bar codes in a manner similar to that described in reference to the physical structures in FIGS. 6a-6f.

Figure 6A:
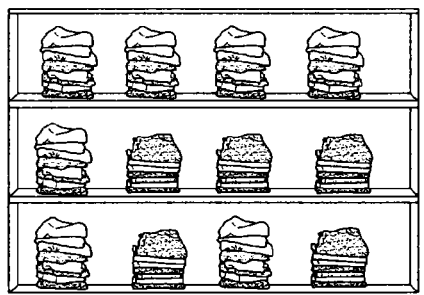
FIGS. 6a-6f depict various embodiments of an aspect of the present invention.
Figure 6B:
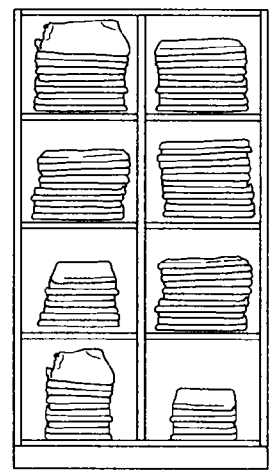
Figure 6C:
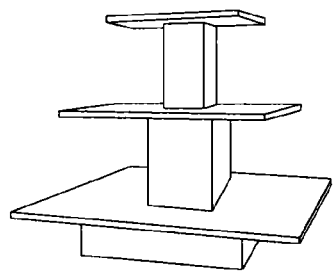
Figure 6D:
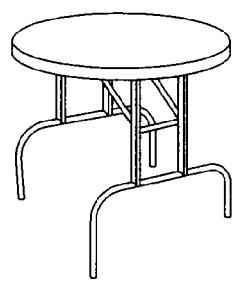
Figure 6E:
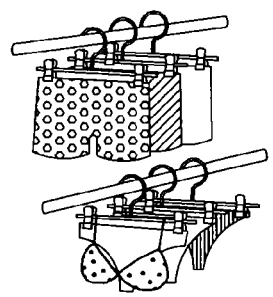
Figure 6F:
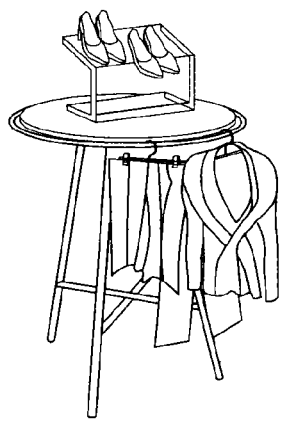

Referring to FIGS. 6a-6f, custom bar codes describing these physical structures and inventory configurations specify both the number of physical structure surfaces, including but not limited to, the number of physical structure surfaces, e.g., shelves and/or bars, and the number of stacks per physical structure surface. For example, a custom bar code describing FIG. 6a describes the 3 shelves as well as the 4 stacks of inventory, in this case clothing, per shelf. In FIG. 6b, the custom bar code describes 4 shelves and 2 stacks per shelf. In FIG. 6c, the custom bar code describes 3 shelves and 4 stacks per shelf. In FIG. 6d, the custom bar code describes 1 shelf and 1 stack per shelf. The custom bar code describing FIG. 6e describes 2 bars and a stack per bar. For FIG. 6f, the custom bar code describes 1 bar/shelf and a stack per shelf.

As discussed in reference to FIG. 2, the custom bar code may contain all the descriptive information or it may be a key to looking up the full information in a local or remote data source.

The custom bar codes associated with the various physical structures are placed on these physical structures. The physical location of each custom bar code on a given physical structure becomes a location that is used in mapping. The bar code location on the physical structure matches the initial point coordinates; it is obtained either directly from the bar code, or indirectly from a database, like in FIGS. 2 and 4.

Figure 7A:
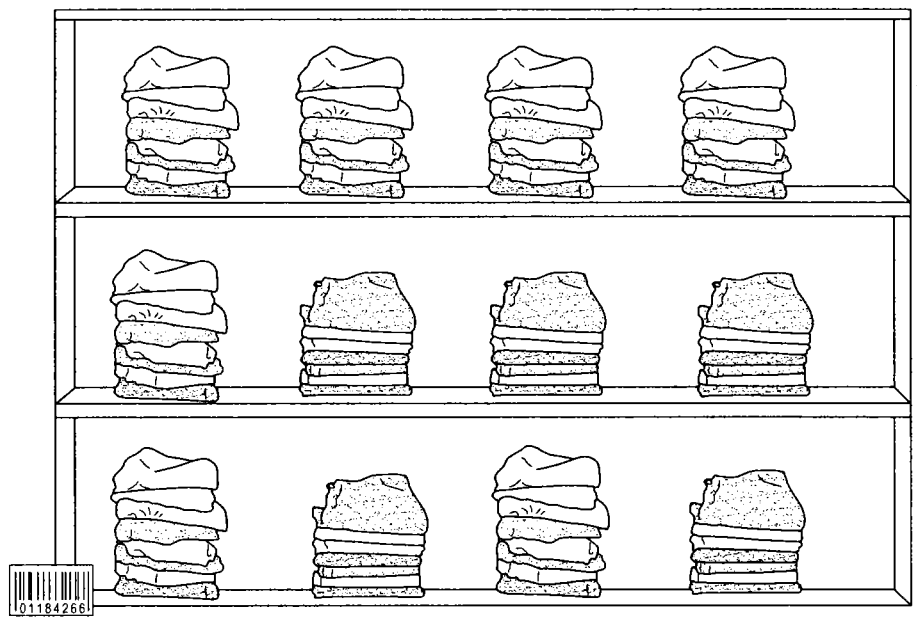
FIGS. 7a-7b depict various embodiments of an aspect of the present invention.
Figure 7B:
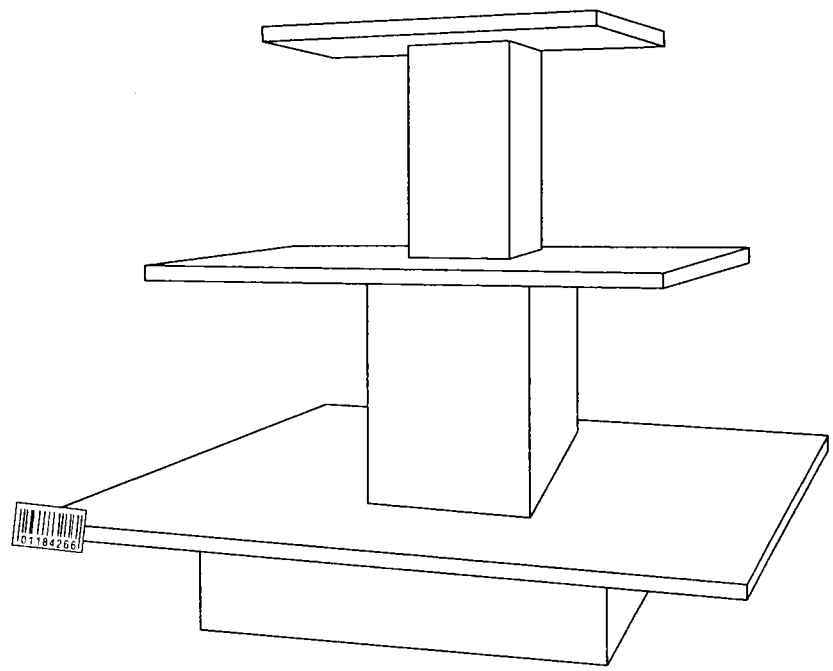

FIGS. 7a and 7b depict two physical structures with their associated custom bar codes affixed to a given location on each physical structure.

In an embodiment of the present invention, the location of each bar code on each physical structure matches the coordinates obtained from either the bar code itself, from a local database that is queried with the information encoded in the bar code, or from a remote database, that is queried with information encoded in the bar code. In an embodiment of the present invention, the bar code is located on the left side of the lowest shelf of the physical structure, as seen in FIGS. 7a-7b.

Figure 11A:
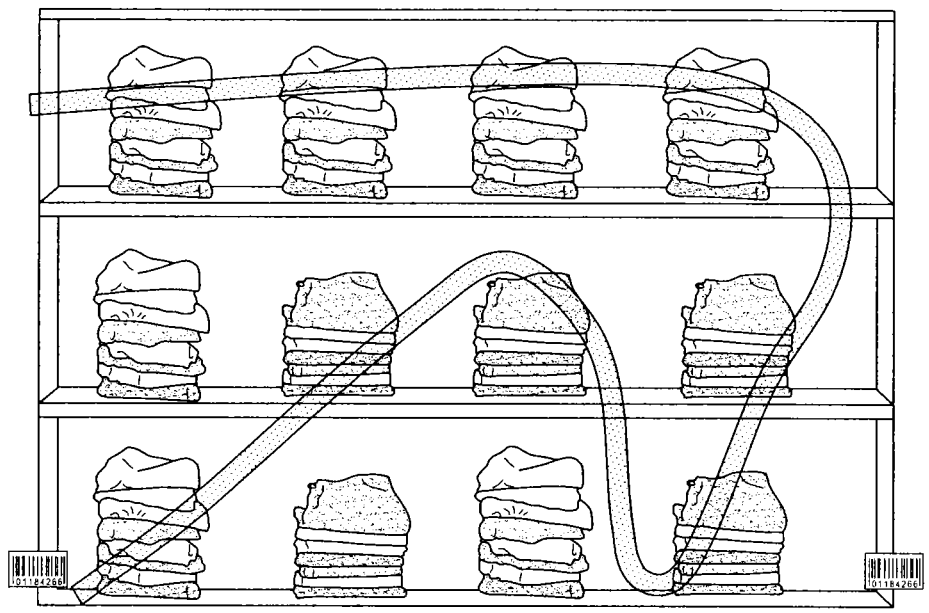
FIG. 11a-11b depicts an embodiment of an aspect of the present invention.
Figure 11B:
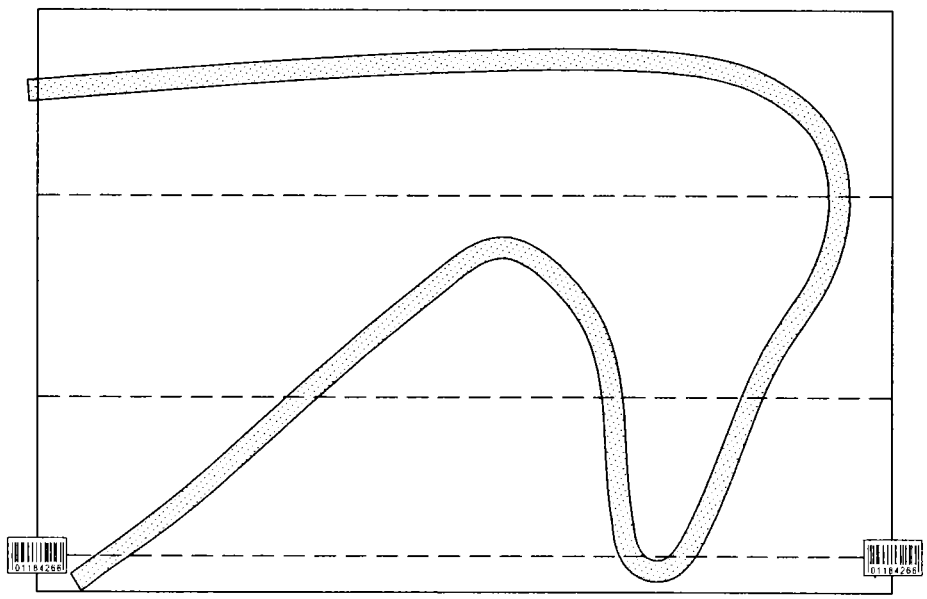

For simplicity, physical structures scanned utilizing the system and method disclosed each have only a single bar code with full or partial data. For very large, i.e., wide, physical structures, additional bar codes may enable a more efficient workflow for an EIR terminal operator, as illustrated by FIGS. 11a and 11b.

Returning to FIG. 4, after utilizing the mechanism for scanning images of decodable indicia 240 in the EIR terminal 210 to scan a custom bar code (S410), the data is decoded (S420) using program code executed on a processor within the EIR terminal 210, or using program code on a resource accessible to the EIR terminal 210, in a client-server-type configuration.

The program code for execution can be stored either on a resource or resources internal to the EIR terminal 210, on a resource or resources accessible to the EIR terminal 210, but external, or on a combination of both internal and external resources.

Once decoded, the decoded data is used to query the database 260 over the wireless network connection 250 to retrieve additional information about the physical structure, including but not limited to, the number of physical shelves/bars, as well as the dimensions of the physical structure, which are stored in the database 260, which in this embodiment, is indexed by bar code (S430). The wireless network connection 250 is not limited to this specific communications connection and can include other communications connections, including an intranet connection and an internet connection. At least some of the information that is retrieved is displayed in the GUI 230 (S440).

Although the embodiment of FIG. 4 includes a database lookup S430, this step is optional as further embodiments of the present invention do not contain this step. To symbolize the optional nature of this step, the box in the workflow 400 is depicted as a broken line.

In another embodiment of the present invention (not pictured), the mechanism for scanning images of decodable indicia 240 in the EIR terminal 210 is used to scan a custom bar code, and encoded in the bar code itself is data describing the physical structure. Like in FIG. 4, at least some of this data is displayed in the GUI 230 (S440) for user verification.

In another embodiment of the present invention (not pictured), the mechanism for scanning images of decodable indicia 240 in the EIR terminal 210 is used to scan a custom bar code, and data describing the physical structure is retrieved by the EIR terminal 210 from a storage resource that is local to the EIR terminal 210. Like in FIG. 4, at least some of this data is displayed in the GUI 230 for user verification. FIG. 5b is an example of a custom bar code that can be utilized by embodiments of the present invention that do not supplement the scanned bar code data with descriptive data from local and/or remote resources. The bar code of FIG. 5b includes complete descriptive information about the physical structure. Upon decoding this bar code, the descriptive information used by the system and method is available, and at least some of this data is displayed on the GUI.

In an embodiment of the present invention, the database also stores the physical location of the custom bar code on the physical structure. In embodiments where this information is stored, the location of the custom bar code can be displayed on the GUI 230 to guide the user of the EIR terminal 210 during calibration and/or re-calibration activities.

The information displayed in the GUI 230 includes, but is not limited to, the type of physical structure (numbers of shelves/bars), and the location of the custom bar code on the physical structure. The user can verify the displayed information using the GUI (S450). In embodiments of the present invention, the GUI 230 renders this information as one or more images, descriptive text, and/or a combination of image (s) and text. If the information in the GUI is incorrect in that it is not representative of the physical structure with the custom bar code that was scanned, the user can re-scan the bar code on the physical structure (S410).

In an embodiment of the present invention, to complete calibration of the physical structure with the scanned custom bar code, the EIR terminal 210 is "tapped" on the custom bar code (S460). To "tap," the user follows the red laser light of the bar code scanner 240 to the bar code and touches the bar code scanner 240 to the printed bar code on the physical structure. In another embodiment of the present invention, the tap can be accomplished without the use of the laser guide. In this embodiment, the user performs a mechanical tap at a predetermined location, i.e., the location of the custom bar code.

This "tap" creates a spike in the accelerometer data. This spike is detected by the 3D accelerometer package 270 in the EIR terminal 210 (S470). Upon detection, the EIR terminal stores the coordinates as an initial point (S480) in the local reference frame (x0, y0, z0). In the EIR terminal reference frame, the current coordinates are set to (0,0,0). Thus, as the EIR terminal 210 (and therefore the accelerometer package 270) moves, the motion data with respect to the (0,0,0) coordinates can be mapped to the local reference frame using the initial point coordinates (x0,y0,z0). In another embodiment of the present invention, instead of scanning a bar code before "tapping," the RFID scanner 220 in the EIR terminal 210 can be utilized to read an RFID tag affixed to a designated location on a physical structure. In this embodiment, the location of this RFID tag is "tapped" to set the initial point coordinates.

In another embodiment of the present invention, the "spike" in the accelerometer data can be used to determine the orientation of the EIR terminal relative to the physical structure. In this embodiment, the initial orientation data is used to establish the initial orientation of the EIR terminal, and align the EIR terminal frame of reference with the local frame of reference relative to the physical structure. In an embodiment of the EIR terminal that includes 3-axis magnetometers, and 3-axis gyroscopes, these devices assist in determining the orientation of the physical structure.

In an embodiment of the present invention, the local reference frame (real) coordinates of the location of a bar code or RFID tag on a physical structure can be included in the encoded data within the bar code or RFID tag. In this embodiment, when the EIR terminal scans the bar code or RFID tag, it acquires the (x0,y0,z0) coordinates in the local reference frame. As aforementioned, in another embodiment of the present invention, the local reference frame coordinates can also be stored in a resource either external or internal to the EIR terminal. In this embodiment, the RFID tag or custom bar code affixed to the physical structure contains sufficient data to query the resource for additional information, including the coordinates of the scanned bar code or RFID tag.

In this workflow 400, in the "scan" portion S410, an EIR terminal scans a signal of decodable indicia, such as a bar code or RFID tag, and this EIR terminal reads the coordinates of the signal in the local reference frame. During the "tap," S460, i.e., tapping the EIR terminal at the location of the signal of decodable indicia, the resultant spike in the accelerometer data causes the initial point coordinates (x0, y0, z0) to be stored S480. In the local reference frame, the coordinates are set to (x0y,0,z0). Thus, as the EIR terminal moves through three-dimensional space, motion with respect to the EIR terminal's own (0,0,0) can be mapped to the local reference frame using the initial point coordinates (x0, y0, z0).

After the "scan" and "tap" steps are complete, the 3D accelerometer package 270 in the EIR terminal 210 can be used to begin real-time location tracking of the EIR terminal's position (S490) because the EIR terminal reference frame has been mapped to the local reference frame. The scan path of the EIR terminal 210 is mapped using the 3D accelerometer package 270, which outputs data used to map the path of the EIR terminal relative to the location of the initial point (x0, y0, z0). As the user moves the RFID scanner 220 through three dimensional space to, for example, read RFID tags, the collected accelerometer data is used to track the movement. Movement is measured by the 3-axis accelerometer package 270 in "real" units of RFID scanner 220 movement, which must be "mapped" appropriately to the initial point and scaled for display by the GUI 230. Data is collected from the accelerometer package during movement (S491).

In embodiments of the present invention that utilize either accelerometer package 270 or IMU-based location tracking, there is a finite period of time during which the IMU data has adequate accuracy. This time period begins at the "tap" (S460), and ends when a pre-defined error tolerance is exceeded.

As location data is collected (S491), the EIR terminal checks whether the noise level in the collected data is approaching the noise threshold (S492). If the noise level is below the threshold, the data collection continues (S491) until the data noise approaches the threshold.

In an embodiment of the present invention that additionally collects data regarding the orientation of the EIR terminal, this data can also contribute to the noise threshold.

In an embodiment of the present invention, when the data noise level approaches the threshold and the motion tracking is about to end and/or when the actual tracking has ceased, the user is notified via an audible and/or visible signal. First, the EIR terminal will deliver an audible and/or visual warning that the motion tracking is about to end (S493). If the conditional test for error tolerance reveals that the tolerance has been exceeded (S494), the EIR terminal delivers an audible and/or visual notification (S495). Should a user who receives the "end of tracking" notification desire to resume motion tracking, the user can repeat the scan and tap processes with the EIR terminal 210 (S410).

Figure 8A:
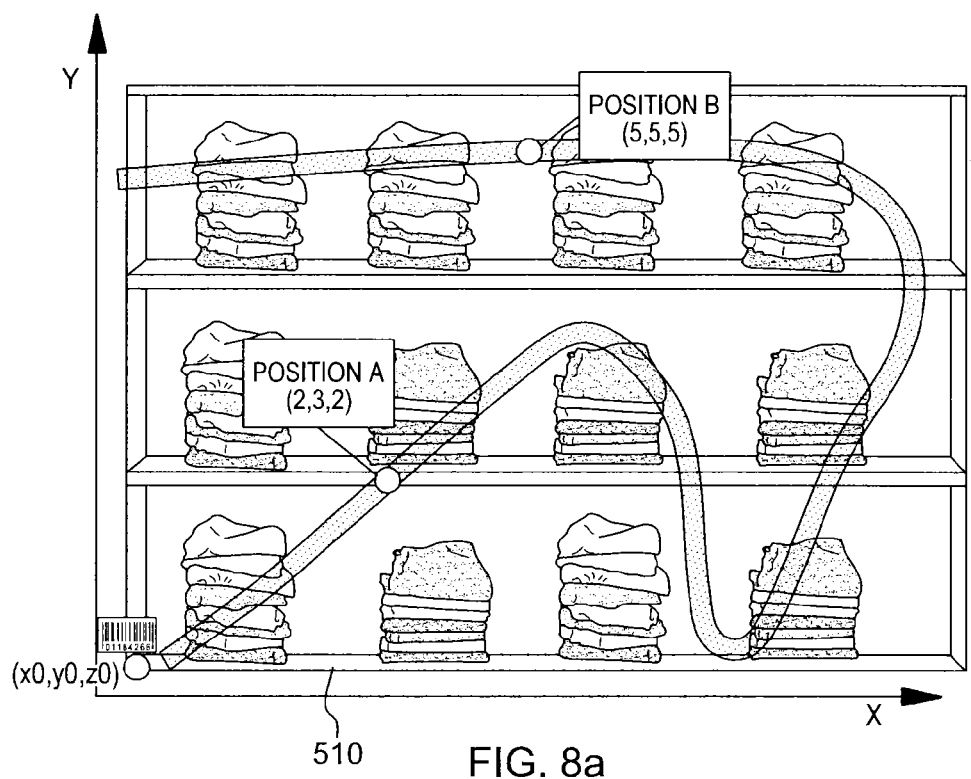
FIGS. 8a-8b depicts an embodiment of an aspect of the present invention.
Figure 8B:
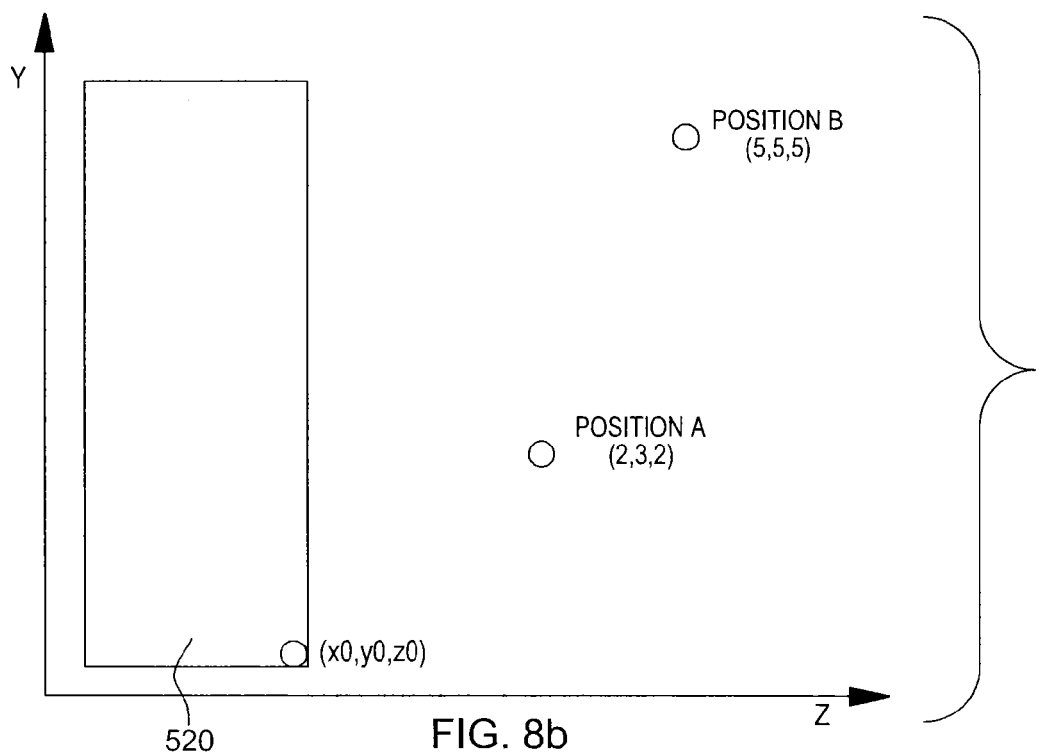

FIGS. 8*a*-8*b* depict relative locations of the EIR terminal computed from data output by the 3-axis accelerometer 270 in the EIR terminal 210 at various positions relative to the custom bar code, where the EIR terminal 210 was tapped. The front view of the physical structure 510 and a side view 520 of the same physical structure are both represented in FIG. 8. The arrows indicate the directions of the X, Y and Z axes in the local reference frame. These axes provide a basis for measurement with respect to the physical structure to be scanned. In an embodiment of the present invention, the IMU uses its own reference frame when reporting motion data.

The positioning is not to scale in FIG. 8 and is meant to impart a relative understanding of some general concepts related to the system and method.

Depicted in both FIG. 8*a* and FIG. 8*b* is the position (x0, y0, z0). These coordinates in the local reference frame are used to map the EIR terminal's own coordinates to (0,0,0) in its reference frame following the "tap" step S470.

For example, if the initial point coordinates=(1,2,0), and the EIR terminal (the IMU in the terminal) moves 1 unit of measure to the right (along the X-axis) after the "tap," then the IMU is at (0,0,0)+(1,0,0)=(1,0,0) in the reference frame of the EIR terminal and this is mapped to (x0, y0, z0)+(1,0,0)=(x0+1, y0, z0) in the local reference frame. Thus, given an initial point of (1,2,0) the local reference frame coordinates of the EIR terminal would be (1,2,0)+(1,0,0)=(2,2,0).

Position A in FIGS. 8a-8b indicates the coordinates of (2,3,2), meaning that the EIR terminal motion passed through this point in 3D space, at +2 units on the x-axis, +3 units on the y-axis, and +2 units on the z-axis relative to the location of the custom bar code at (x0,y0,z0) in the local reference frame. In the EIR terminal reference frame, the position would be (0,0, 0)+(2,3,2)=(2,3,2). In the local reference frame, the position would be (x0, y0, z0)+(2,3,2)=(x0+2, y0+3, z0+2). Position B, with coordinates (5, 5, 5) is +5 units away from (x0,y0,z0) in the local reference frame. Thus, in the local reference frame, with an initial point at (1,2,0) the Position A would be (x0, y0, z0)+(5,5,5)=(1,2,0)+(2,3,2)=(3,5,2). In the local reference frame, the Position B would be (x0, y0, z0)+(5,5,5)= (1,2,0)+(5,5,5)=(6,7,5).

In the event of inherent accelerometer noise exceeding a preset threshold, the GUI 230 prompts the user to re-calibrate, re-read the barcode with the scanning mechanism 240 and re-tap the RFID scanner 220 (S410). In one embodiment of the present invention, the prompt is an audible cue, rather than a visual cue. The audible and visual cue (in the GUI 230), are combined in another embodiment of the present invention.

Calibration of the EIR terminal 210 can be helpful during inventory scanning to increase speed and accuracy. FIG. 9 depicts a workflow 900 of an aspect of an embodiment of the present invention. This workflow 900 is described with reference to the technical architecture of the EIR terminal of FIG. 2. When data is available to the GUI 230 to render a visual display of one or more scan paths, the data is useful in determining that a scan path is complete, i.e., has read the inventory tags on the physical structure.

The term bar code is used throughout the description of the workflow of FIG. 9 to describe an signal of decodable indicia. One of skill in the art will recognize that RFID tags can be substituted for bar codes throughout this workflow. The EIR terminal would be utilized to read (scan) these RFID tags instead of scanning the custom bar code(s).

Figure 10A:
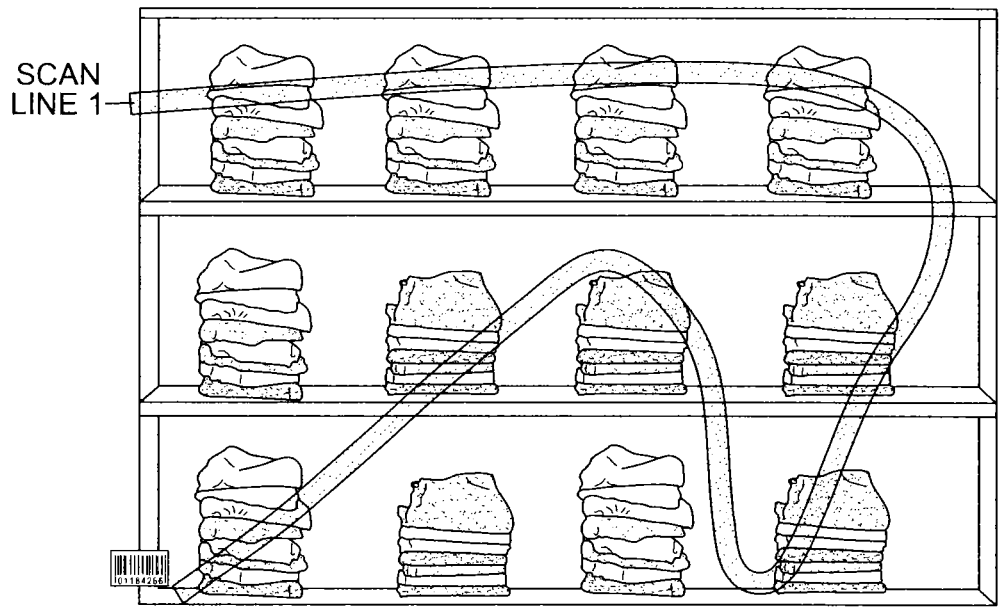
FIGS. 10a-10b depict various embodiments of an aspect of the present invention.

In an embodiment of the present invention, a user reviews a recorded scan path on the GUI 230 to determine if all RFID tag locations have been scanned (S905). The determination is made utilizing the configuration of the physical structure and the physical dimensions/stack configuration of the physical structure In this embodiment, in the GUI 230, a first scan line indicates scan path of first or previous pass. The GUI 230 representation of this first scan path, the first scan line, is represented by FIG. 10a as Scan Line 1. In FIG. 10a, the Scan Line 1 indicates the path of the EIR terminal 210 relative to a physical structure. As in FIG. 10a, when user examination of the GUI 230 determines that some tag locations, i.e., stacks, have not been scanned, the user repeats the "tap" and "scan" activities so that the movement of the EIR terminal's reference frame is again mapped to the local reference frame. The bar code or RFID tag is scanned (S910) and the encoded data is decoded (S915). As described earlier, depending upon the embodiment of the present invention, the data can be decoded locally, remotely, or the processes can be split over both remote and local resources. Then, physical structure descriptive information is retrieved and displayed in the GUI 230 (S920). As discussed earlier, in various embodiments of the present invention, the physical structure information displayed in the GUI can be wholly available in the bar-coded data, or a portion of the data can be available to the barcode, with the remainder being supplemented by a local and/or remote resource.

When the physical structure data is displayed in the GUI 230, the user verifies that the displayed data represents the physical structure (S925). If the displayed data is not correct, the user re-scans the barcode and repeats the process (S910). If the user verifies the data, the user then taps the EIR terminal 210 on the custom bar code (S930).

In FIG. 10a, the custom bar code is located on the lower left of the physical structure. This "tap" creates a spike in the accelerometer data. The tapping spike is detected by the 3D (3-axis) accelerometer package 270 in the EIR terminal 210 (S935). Upon detection, the (x0,y0,z0) coordinates of the initial point of the "scan path" are set to reflect the physical location of the bar code on the physical structure (S940), creating an initial point with coordinates (x0,y0,z0) for use when tracking the movement of the EIR terminal when scanning the RFID tags on the inventory on the physical structure. As discussed earlier, the accelerometer data caused by the "tap" can be used to determine the initial orientation of the EIR terminal relative to the physical structure, and align the EIR terminal frame of reference with the local frame of reference relative to the physical structure.

In an embodiment of the present invention, the X0 and Y0 locations can be obtained from the bar code, and Z0 is set to zero. The point of contact, the initial distance between the EIR terminal and the stationary object is defined to be zero. The initial distances along the X-axis and Y-axis are set to the values determined by the custom barcode and/or RFID tag that was scanned immediately prior to the occurrence of mechanical contact between the EIR terminal and the physical structure.

In FIG. 10a, the image viewable is a pre-stored image of a physical structure that is retrieved from a local or remote storage resource for display in the GUI based on data acquired by scanning a bar code or reading an RFID tag. As discussed, this data can be wholly embedded in the data in the signal of decodable indicia, or it can be retrieved from a local or remote storage resource using the decoded data from the signal of decodable indicia.

However, an embodiment of the present invention is also capable of rendering an image of a physical structure based on the physical dimensions either embedded in the signal of decodable indicia or retrieved from a remote or local storage resource utilizing the decoded data from the signal of decodable indicia in the query. The embodiment of FIG. 11b depicts the same scan trace image as FIG. 11a, but in FIG. 11b the image of the physical structure was rendered from the physical dimension data.

With the establishment of this initial point, dimensions of the physical structure, movement data from the 3D accelerometer package and the pixel dimensions of the GUI display 230, the EIR terminal movement is mapped for display on the GUI 230 using a scaling factor (e.g., inches per pixel). The program code's data is calibrated regarding the initial position of the EIR terminal 210 in the local reference frame of the physical structure.

After the initial point (x0,y0,z0) coordinates are established on a given physical structure, the RFID scanner 220 in the EIR terminal 210 is used to scan the previously unscanned stacks in reference to FIG. 4, as displayed in the GUI 230 (S945).

As discussed in reference to FIG. 4, in an embodiment of the present invention that utilizes either accelerometer package 270 or IMU-based location tracking, the scan path tracking is time-sensitive and ends when a pre-defined error tolerance is exceeded.

While the EIR terminal moves, data is collected from the accelerometer package (S950). The EIR terminal checks whether the data noise level is approaching the threshold (S955). Thus, in an embodiment with this feature, when the real-time tracking is nearing completion, i.e., the data noise level is approaching the threshold, an alert is sounded and/or displayed by the EIR terminal (S960). When the error tolerance (and therefore the real-time tracking) is exceeded (S965), an alert is sounded or displayed (S970) by the EIR terminal and the process terminates unless the scan and tap is repeated (S910).

Figure 10B:
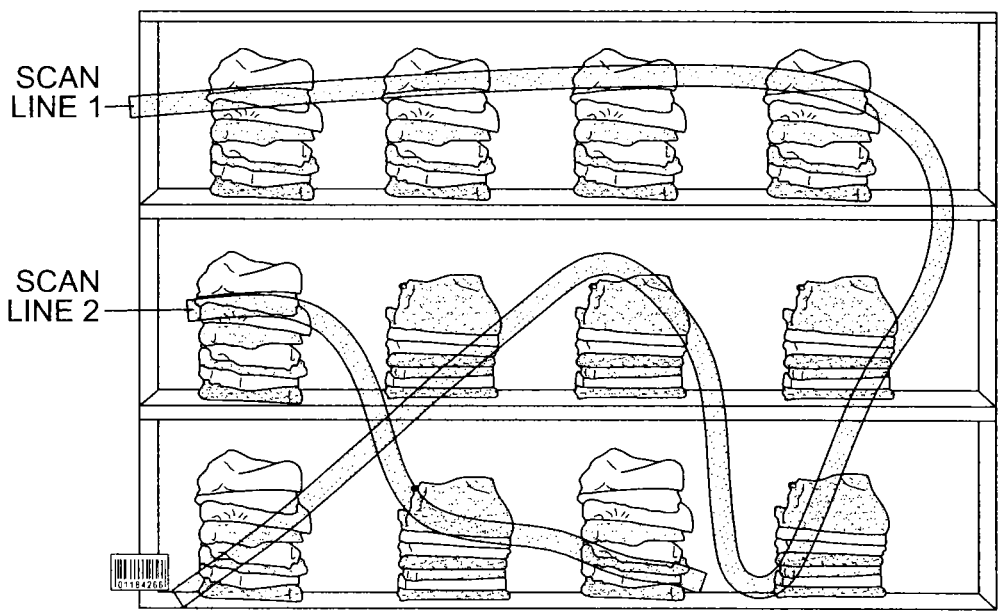

Whether or not the inventory is scanned, the EIR terminal is moved in space and new coordinates can be established relative to the (x0,y0,z0) coordinates. In an embodiment of the present invention, the EIR terminal 210 provides unique audible feedback when EIR terminal 210 is pointed at previously unscanned stack(s). In an embodiment of the present invention, the newest scan trace is depicted as Scan Line 2 in FIG. 10*b*. Referring the FIG. 10*b*, the line of the second scan trace is labeled Scan Line 2 and the first scan line, also depicted in FIG. 10*a*, is labeled Scan Line 1. During the scanning process, the user can refer back to GUI 230 for which stacks remain unscanned and repeat calibration and scanning as needed in order to complete scanning the entire physical structure. Further scan paths can be established and displayed in accordance with the movement of the EIR terminal. The two scan paths in FIGS. 10*a*-10*b* are examples and are not meant to reflect any limitation in the functionality of the apparatus and method described.

In an embodiment of the present invention, to utilize the EIR terminal 210 to scan a stack that was previously unscanned, the user points the scanner, e.g. the red light from a laser scanner, at the unscanned stack and triggers the scanning control. In effect, the user is "checking" this location. Utilizing the previously determined point of original, i.e., the (x0,y0,z0) coordinates, the EIR terminal executes program code to calculate the position of this supposed unscanned stack in comparison to the (x0,y0,z0) position to determine whether or not this current position, based on its location, was scanned. With this relative positioning data, the EIR terminal can utilize one or more of current location information, shelf configuration and dimensions, and previous scan path(s), to determine if this indicated stack has been scanned previously or should be scanned.

To aid in the efficiency of this system and process, an embodiment of the present invention offers indicators, such as sounds and visual cues, when certain activities occur. These activities include but are not limited to 1) not all stacks of inventory bearing RFID tags have been scanned but the scanning activity is paused for a given period of time, and 2) not all stacks of inventory bearing RFID tags are scanned but the user has turned off or released a trigger on the RFID scanner 260 in the EIR terminal 210, 3) the completion of scanning all stacks with inventory bearing RFID tags, 4) the imminent loss of accuracy of 3D accelerometer data necessary for determining a scan path, and 5) termination of scan path data collection from the 3D accelerometer due to loss of data accuracy.

In order to minimize the delay caused by needing to re-calibrate due to accumulated accelerometer error, more than one bar code can be placed on each physical structure. If more than one bar code is available, the user can scan and "tap" the closest bar code available when re-calibration is necessary. The availability of bar codes in more than one position can save time. Bar codes can alternatively be located on both left and right side of lowest shelf, rather than just on one side, making a bar code accessible to a user more readily. Efficiency can be improved by mounting bar codes in ergonomically preferred locations on the physical structure. However, the system and method of the present invention places no constraints on where a bar code can be located.

When more than one bar code is affixed to a physical structure, each bar code is unique, so that the relative distance calculations from each of these initial points on the physical structure will be mapped accurately. Each bar code on the same physical structure would either include or be used to retrieve data in the database 260 relating to the same physical structure shelf description, but a different bar code location. Although the locations for the bar codes on physical structures may vary, to reduce human hours required to scan, placing the bar codes at a height of approximately 30 inches above the floor, about waist-height for a person performing scanning, will make the bar codes quickly accessible to an individual involved in scanning and calibration. An easily accessible bar code helps diminish errors where a user scans the bar code, but "taps" elsewhere. This error affects the accelerometer data and reports inaccurate relative distances when mapping the motion to the GUI 230.

As aforementioned, the EIR terminal 210 is used for scanning bar codes as well as reading RFID tags. The usability of the EIR terminal 210 when performing these functions, and the ability to seamlessly alternate between these functions when scanning and then tapping, affects the efficiency of the process. The EIR terminal 210 can be configured in different manners to increase its usability. In an embodiment of the present invention, the EIR terminal 210 has an input that initiates both the RFID scanning and bar code scanning functionality when selected at one time. Inputs include but are not limited to touchscreen, triggers, buttons, and/or keys. The input can be selected by pressing a trigger and/or depressing (or releasing) a button or key. In another embodiment, the user selects an input one time to scan the custom bar code, releases the input to confirm the information retrieved from the database 260 that appears in the GUI 230, and selects the input a second time to activate the RFID scanner 220. In this embodiment, the 3-axis accelerometer package 270 is active constantly from the initial trigger activation.

In an embodiment of the present invention, the RFID reader and the bar code scanner are not active at the same time. First, the bar code scanner is enabled, then turned off following the "tap", at which time the RFID reader is enabled and later turned off when either the accelerometer error grows too large or the stop input is pressed/released.

The presence of a laser scanner as the bar code reading mechanism 240 to scan bar codes in the EIR terminal 210 can assist the user of the EIR terminal 210 in scanning the RFID tags of inventory on a physical structure. In an embodiment of the present invention, the laser scanner bar code reading mechanism 240 can double as a laser pointer so the user can position the EIR terminal 210 in a manner where reading the RFID tags on a stack is most effective. For example, the user will point the laser pointer at the inventory stack he or she desires to scan and pull a trigger to initiate reading the RFID tags in the selected stack. This functionality is particularly relevant when a user scans for stacks that were not scanned during previous scan paths. When the user points the laser pointer at a stack that he/she wants to scan, the EIR terminal 210 utilizes the coordinates relative to the established baseline, i.e., the current location, shelf configuration and dimensions, and/or previous scan path(s) data to determine if the indicated stack of inventory bearing RFID tags should be scanned and alert the user with an audible or visual signal.

Figure 12:
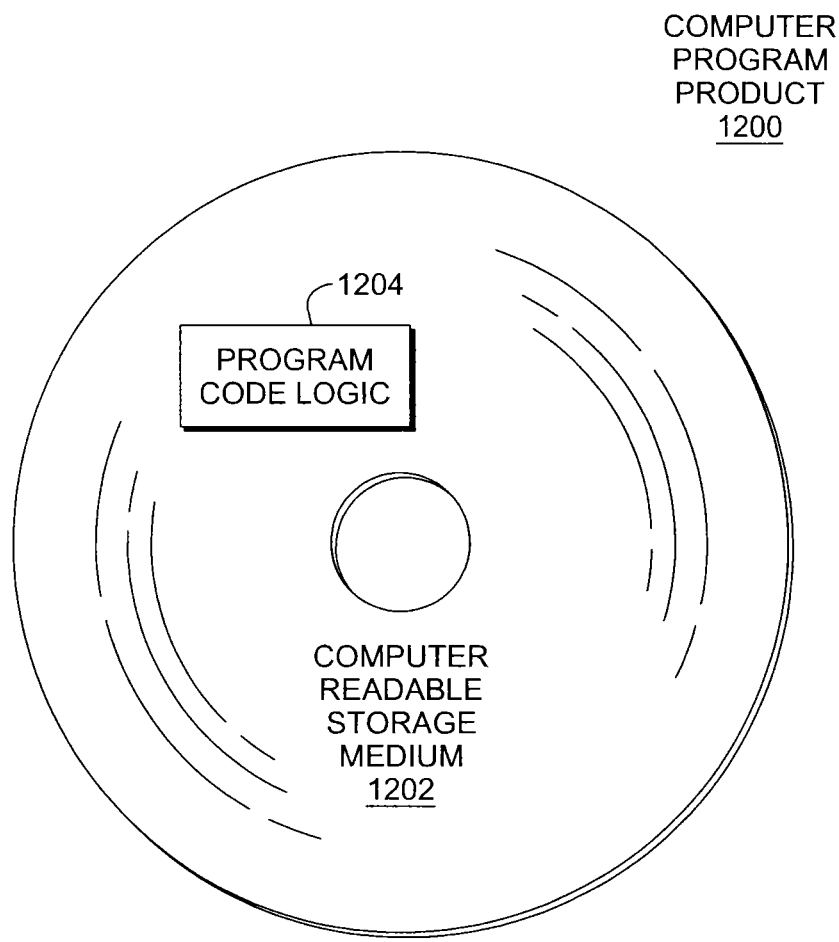
FIG. 12 depicts a computer program product incorporating one or more aspects of the present invention.

Computer-readable code or instructions need not reside on the enumerated computer systems: database 260 and EIR terminal 210 of FIG. 2. Referring to FIG. 12, in one example, a computer program product 1200 includes, for instance, one or more non-transitory computer readable storage media 1202 to store computer readable program code means or logic 1204 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on one resource of a data processing and storage system, such as a cloud, partly on various resources, and/or partly on the EIR terminal and partly on one or more resources of the data processing and storage system.

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiment with various modifications as are suited to the particular use contemplated.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein, that different embodiments can be realized.

The invention claimed is:

1. An apparatus comprising:
a scanning device configured to scan a signal of decodable indicia on a pre-defined area of a physical object wherein decoding said decodable indicia results in a decoded message, that contains information describing said physical object;
a memory;
a motion sensing device;
wherein, responsive to making mechanical contact with said pre-defined area of said physical object, a point of origin of said apparatus described by information in the decoded message at said pre-defined area of said physical object is stored into memory; and
wherein, responsive to the physical movement of said apparatus, a second spatial position of said apparatus is determined relative to said point of origin based on a plurality of values received from said motion sensing device.

2. The apparatus of claim 1 wherein said apparatus is further configured, to store in said memory a first orientation of said apparatus at said point of origin; and wherein said apparatus is further configured to determine, responsive to the physical movement of said apparatus, based on a second plurality of values received from said motion sensing device, a second orientation of said apparatus relative to said first orientation.

3. The apparatus of claim 2, wherein responsive to moving said apparatus through three dimensional space relative to said physical object, said apparatus is further configured to receive values from said motion sensing device representing the orientation of said apparatus in three dimensional space relative to said first orientation, and
wherein said apparatus is further configured to retain said values.

4. The apparatus of claim 2, wherein said motion sensing device is provided by a 9 degree of freedom Inertial Measurement Unit, wherein said 9 degree of freedom Inertial Measurement Unit comprises a 3-axis accelerometer, a 3-axis magnetometer, and a 3-axis gyroscope.

5. The apparatus of claim 1, wherein responsive to moving said apparatus through three dimensional space relative to said physical object, said apparatus is further configured to receive values from said motion sensing device representing the movement of said apparatus in three dimensional space relative to said point of origin, and
wherein said EIR terminal is further configured to retain said values.

6. The apparatus of claim 1, further comprising a communication interface configured to receive said decoded message, to display said information describing said physical object, and is further configured to utilize said decoded message to query a resource said communication interface further configured to receive a response from said resource wherein said response comprises additional information describing said physical object, said communication interface further configured to display said additional information describing said physical object, wherein said resource is provided by one or more of: a memory, a client.

7. The apparatus of claim 1, wherein said motion sensing device is provided by at least three accelerometers configured to measure proper acceleration values of said apparatus in at least three mutually-perpendicular directions.

8. The apparatus of claim 1, wherein said motion sensing device is provided by at least three accelerometers configured to measure proper acceleration values of said apparatus in at least three mutually-perpendicular directions,
wherein said apparatus is further configured to determine a change of a spatial position of said apparatus based on proper acceleration values received from said at least three accelerometer; and
responsive to said EIR terminal making mechanical contact with said pre-defined area of said physical object, said point of origin is represented by setting the value of the coordinate to zero n each of said three mutually-perpendicular directions.

9. The apparatus of claim 1, wherein said scanning device is provided by at least one of: an optical scanner, a camera, an RFID reader.

10. The apparatus of claim 1, further comprising communication interface comprising a graphical user interface and a wireless network connection that are configured to receive said decoded message and to display said information describing said physical object.

11. The apparatus of claim 1, wherein said signal of decodable indicia is at least one of: a 2D bar code, a 3D bar code, an EPC symbol, an RFID tag.

12. The apparatus of claim 1, wherein said physical object is a physical structure for inventory and wherein said information describing said physical object comprises at least one of: the location of the signal of decodable indicia on the physical structure, the number of physical structure surfaces on said physical object, the number of stacks of inventory on each of said physical structure surfaces, the physical dimensions of said physical object.

13. A method of mapping a location of at least one object in three dimensional space, relative to an initial point in three dimensional space by an apparatus comprising memory, a scanning device, and a motion sensing device said method comprising:
scanning a signal of decodable indicia wherein said signal of decodable indicia is located on a pre-defined area of a physical object;
responsive to detecting a communication interface command, making mechanical contact with said pre-defined area of said physical object;
responsive to making mechanical contact with said pre-defined area of said physical object, storing in said memory a first location of said apparatus as a point of origin;

moving through three dimensional space relative to said physical object;

responsive to moving through three dimensional space relative to said physical object, receiving values from said motion sensing device representing a location of said apparatus in three dimensional space relative to said point of origin; and retaining said location.

14. The method of claim 13, further comprising:

storing in said memory a first orientation of said apparatus at said point of origin; and responsive to moving through three dimensional space relative to said physical object, receiving a second set of values from said motion sensing device representing a second orientation of said apparatus in three dimensional space relative to said first orientation; and said retaining said second orientation.

15. The method of claim 14, wherein said motion sensing device is one of: a 3-axis accelerometer package, a 9 degree of freedom Inertial Measurement Unit, wherein said 9 degree of freedom Inertial Measurement Unit comprises a 3-axis accelerometer, a 3-axis magnetometer, and a 3-axis gyroscope.

16. The method of claim 13, further comprising:

said displaying the path of said apparatus through three dimensional space with a first scan line in a communication interface.

17. The method of claim 13, further comprising:

triggering an alert when said values received have reached a data noise threshold; and triggering an alert when said threshold has been exceeded.

18. The method of claim 13, further comprising:

responsive to decoding said decodable indicia into a decoded message, querying a client using said identifier; and receiving a response from said client wherein said response comprises descriptive information about said physical object.

19. The method of claim 13, wherein said motion sensing device is provided by at least three accelerometers configured to measure proper acceleration values of said apparatus in at least three mutually-perpendicular directions.

20. The method of claim 13, wherein said scanning device is provided by at least one of: an optical scanner, a camera, an RFID reader.

21. The method of claim 13, wherein said signal of decodable indicia is at least one of: a 2D bar code, a 3D bar code, an EPC symbol, an RFID tag.

22. A method of mapping a location of at least one object in three dimensional space, relative to an initial point in three dimensional space by an apparatus comprising memory, a scanning device, and a motion sensing device, said method comprising:

scanning a signal of decodable indicia wherein said signal of decodable indicia is located on a pre-defined area of a physical object;

responsive to detecting a communication interface command, making mechanical contact with said pre-defined area of said physical object;

responsive to making mechanical contact with said pre-defined area of said physical object, storing in said memory a first location of said apparatus as a point of origin;

storing in said memory a first orientation of said apparatus at said point of origin;

moving through three dimensional space relative to said physical object;

responsive to moving through three dimensional space relative to said physical object, receiving a first plurality of values from said motion sensing device representing a plurality of locations of said apparatus in three dimensional space relative to said point of origin;

retaining said first plurality of values;

responsive to moving through three dimensional space relative to said physical object, receiving a second plurality of values from said motion sensing device representing a plurality of orientations of said apparatus in three dimensional space relative to said point of origin;

retaining said second plurality of values; and displaying the path of said apparatus through three dimensional space with a first scan line.

23. The method of claim 22, further comprising:

recording a second position on said physical object;

querying whether said second location is represented in said first plurality of values;

receiving information that said second spatial position is not represented in said first plurality of values;

scanning said signal of decodable indicia;

responsive to scanning said signal of decodable indicia, locating said decodable indicia within said signal;

responsive to locating said decodable indicia within said signal, decoding said decodable indicia into a decoded message wherein said decoded message comprises: an identifier for said physical object;

displaying said identifier for said physical object;

responsive to detecting a second communication interface command, making mechanical contact with said pre-defined area of said physical object;

responsive to making mechanical contact with said pre-defined area of said physical object, storing in said memory a second location of said apparatus as a point of origin;

scanning said second spatial position;

determining, based on a second plurality of values received from said motion sensing device, a second position of said apparatus relative to said point of origin; and displaying the path of said apparatus through three dimensional space to said second position with a second scan line.

24. The method of claim 23, further comprising:

responsive to making mechanical contact with said pre-defined area of said physical object, storing in said memory a second orientation of said apparatus; and determining, based on a third plurality of values received from said motion sensing device, a third orientation of said apparatus relative to said second orientation.

* * * * *